United States Patent
Kim et al.

(10) Patent No.: US 8,345,618 B2
(45) Date of Patent: Jan. 1, 2013

(54) DATA TRANSMISSION METHOD IN A MULTI-CARRIER SYSTEM, AND TRANSMITTER

(75) Inventors: Byoung-Hoon Kim, Anyang-si (KR); Jung Hoon Lee, Anyang-si (KR); Jae Hoon Chung, Anyang-si (KR); Young Seob Choi, Anyang-si (KR); Seung Hee Han, Anyang-si (KR); Hyunsoo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/865,102

(22) PCT Filed: Aug. 12, 2009

(86) PCT No.: PCT/KR2009/004489
§ 371 (c)(1),
(2), (4) Date: Jul. 28, 2010

(87) PCT Pub. No.: WO2010/018987
PCT Pub. Date: Feb. 18, 2010

(65) Prior Publication Data
US 2011/0002322 A1    Jan. 6, 2011

Related U.S. Application Data

(60) Provisional application No. 61/088,345, filed on Aug. 12, 2008, provisional application No. 61/144,419, filed on Jan. 13, 2009.

(30) Foreign Application Priority Data

Oct. 27, 2008    (KR) .......................... 10-2008-0105314

(51) Int. Cl.
*H04W 4/00* (2009.01)
(52) U.S. Cl. ........................................ 370/329; 370/341
(58) Field of Classification Search ................... 370/329, 370/204, 320, 341, 344, 252; 455/450; 375/267
See application file for complete search history.

(56) References Cited

U.S. PATENT DOCUMENTS
7,885,176 B2 * 2/2011 Pi et al. .......................... 370/204
(Continued)

FOREIGN PATENT DOCUMENTS
EP    1 928 115 A1    6/2008
(Continued)

OTHER PUBLICATIONS

Myung, H. G. et al., "Peak Power Characteristics of Single Carrier FDMA MIMO Precoding System", IEEE 66th Vehicular Technology Conference, Sep. 30 2007, pp. 477-481.

(Continued)

*Primary Examiner* — Chandrahas Patel
(74) *Attorney, Agent, or Firm* — Birch, Stewart, Kolasch & Birch, LLP

(57) ABSTRACT

A transmitter includes a plurality of transmit antennas, a processor configured to process user data, and a single carrier frequency division multiple access (SC-FDMA) signal generator configured to receive the user data and generate SC-FDMA symbols transmitted through the plurality of transmit antennas. The SC-FDMA signal generator independently performs inverse fast Fourier transform (IFFT) for each transmit antenna, and each of the plurality of transmit antennas is associated with each of a plurality of carriers.

5 Claims, 24 Drawing Sheets

U.S. PATENT DOCUMENTS 8,098,745 B2 * 1/2012 Bertrand et al. ............. 375/260

FOREIGN PATENT DOCUMENTS

| EP | 2 422 475 | 4/2009 |
| KR | 10-2007-0119958 A | 12/2007 |
| KR | 10-2008-0013664 A | 2/2008 |
| KR | 10-2008-0026669 A | 3/2008 |
| KR | 10-2008-0073208 A | 8/2008 |
| WO | WO 2010/12164 A1 | 10/2010 |

OTHER PUBLICATIONS

3GPP TSG—RAN WG 1#55bis; R1-090135; "Evaluation of Transmit Divsersity of PUCCH in LTE-A"; Agenda Item:12.4; Source: Nortel; pp. 1-5; Ljublijana, Slovenia; Dec. 16, 2009.

3GPP TSG-RAN WG1 #56; R1-091048; "PUCCH Transmit Diversity"; Agenda: 12.3; Source: Qualcomm Europe; pp. 1-8; Athens, Greece; Feb. 2009.

* cited by examiner

DATA TRANSMISSION METHOD IN A MULTI-CARRIER SYSTEM, AND TRANSMITTER

CROSS REFERENCE TO RELATED APPLICATIONS

This application is the National Phase of PCT/KR2009/004489 filed on Aug. 12, 2009, which claims priority under 35 U.S.C. 119(e) to U.S. Provisional Application Nos. 61/088,345 filed on Aug. 12, 2008 and U.S. Provisional Application No. 61/144,419 filed on Jan. 13, 2009 and under 35 U.S.C. 119(a) to Patent Application No. 10-2008-0105314 filed in Republic of Korea on Oct. 27, 2008, all of which are hereby expressly incorporated by reference into the present application.

TECHNICAL FIELD

The present invention provides wireless communications, and more particularly, to an apparatus and method of supporting multiple carriers.

BACKGROUND ART

Wireless communication systems are widely spread all over the world to provide various types of communication services such as voice or data. In general, the wireless communication system is a multiple access system capable of supporting communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

While having almost the same complexity with the OFDMA, SC-FDMA has a lower peak-to-average power ratio (PAPR) due to a single carrier property. Since the low PAPR is advantageous for a user equipment (UE) in terms of transmission power efficiency, the SC-FDMA is adopted for uplink transmission in a $3^{rd}$ generation partnership project (3GPP) long term evolution (LTE) as disclosed in section 5 of 3GPP TS 36.211 V8.2.0 (2008-03) "Technical Specification Group Radio Access Network; Evolved Universal Terrestrial Radio Access (E-UTRA); Physical channels and modulation (Release 8)".

The wireless communication system generally uses one bandwidth for transmitting data. For example, a $2^{nd}$ generation wireless communication system uses a bandwidth of 200 KHz~1.25 MHz, and a $3^{rd}$ generation wireless communication system uses a bandwidth of 5 MHz~10 MHz. To support an increased transmission capacity, the next generation wireless communication system continues to extend its bandwidth to 20 MHz or higher. Accordingly, there has appeared a multi carrier system that defines a carrier having one bandwidth and a center frequency and uses a broadband to transmit and/or receive data through a plurality of carriers. Here, one or more carriers are used to support both a narrowband and a broadband. For example, on the assumption that one carrier corresponds to to a bandwidth of 5 MHz, four carriers can support the maximum bandwidth of 20 MHz.

In the SC-FDMA, efficiency of a power amplifier can be improved due to the low PAPR. However, it is not disclosed how to implement the SC-FDMA for maintaining the low PAPR in the multiple carrier system.

DISCLOSURE

Technical Problem

The present invention provides a method for supporting SC-FDMA in a multiple carrier system and a transmitter.

The present invention also provides a transmitter having a low PAPR in a multiple carrier system, and a method of the same.

Technical Solution

In an aspect, a transmitter in a multiple carrier system includes a plurality of transmit antennas, a processor configured to process user data, and a single carrier frequency division multiple access (SC-FDMA) signal generator configured to receive the user data and generate SC-FDMA symbols transmitted through the plurality of transmit antennas. The SC-FDMA signal generator independently performs inverse fast Fourier transform (IFFT) for each transmit antenna, and each of the plurality of transmit antennas is associated with each of a plurality of carriers.

The SC-FDMA signal generator may include at least one discrete Fourier transform (DFT) unit configured to perform DFT to the user data and generate DFT-spread symbols, and a plurality of IFFT units respectively arranged in the plurality of transmit antennas configured to perform IFFT to the DFT-spread symbols and generate the SC-FDMA symbols. The SC-FDMA signal generator may further include a subcarrier mapper arranged between the DFT unit and the plurality of IFFT units.

In another aspect, a method of transmitting data in a multiple carrier system includes generating discrete Fourier transform (DFT)-spread symbols by spreading user data with DFT, generating a control sequence corresponding to control data from a base sequence, performing first inverse fast Fourier transform (IFFT) on the DFT-spread symbols to be transmitted through a first transmit antenna, and performing second IFFT independently of the first IFFT on the control sequence to be transmitted through a second transmit antenna.

Advantageous Effects

A multiple carrier system can keep low PAPR characteristics and subcarrier mapping can easily

MODE FOR INVENTION

Figure 1:
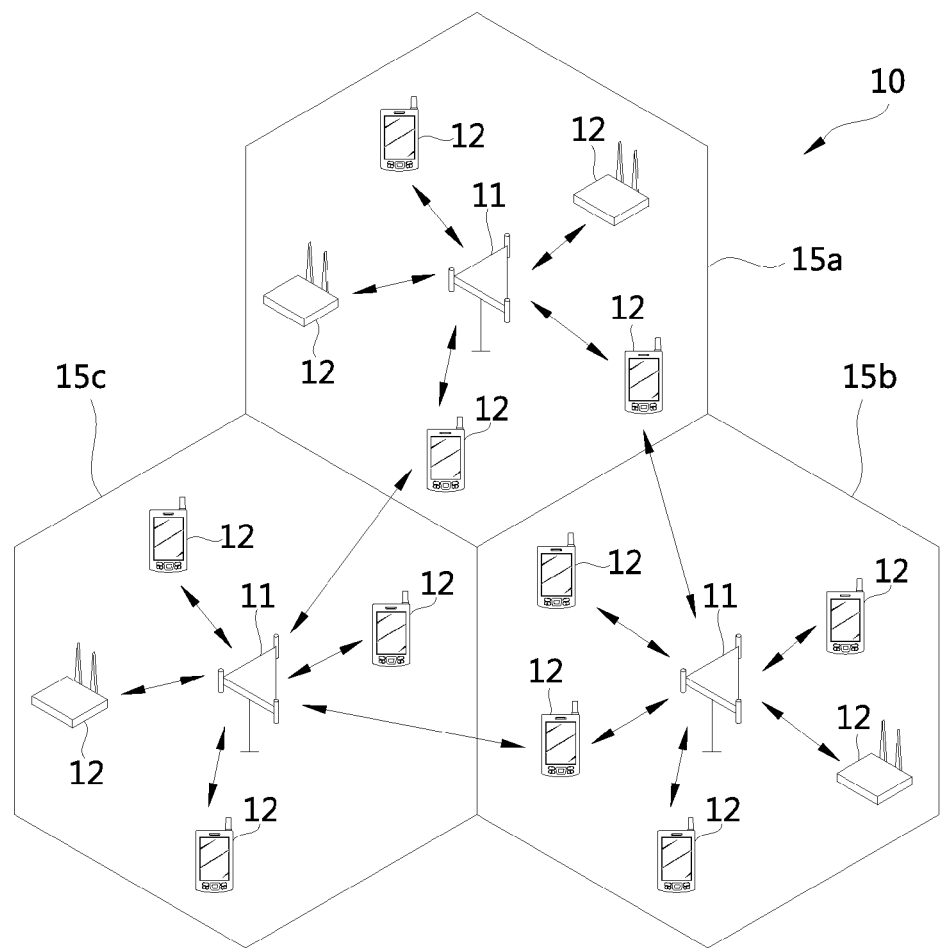
FIG. 1 shows a wireless communication system.

FIG. 1 shows a wireless communication system. A wireless communication system 10 includes at least one base station (BS) 11. Respective BSs 11 provide communication services to specific geographical regions (generally referred to as cells) 15*a*, 15*b*, and 15*c*. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc. Hereinafter, a downlink (DL) denotes a communication link from the BS to the UE, and an uplink (UL) denotes a communication link from the UE to the BS. In downlink, a transmitter may be a part of the BS, and a receiver may be a part of the UE. In uplink, the transmitter may be a part of the UE, and the receiver may be a part of the BS.

Figure 2:
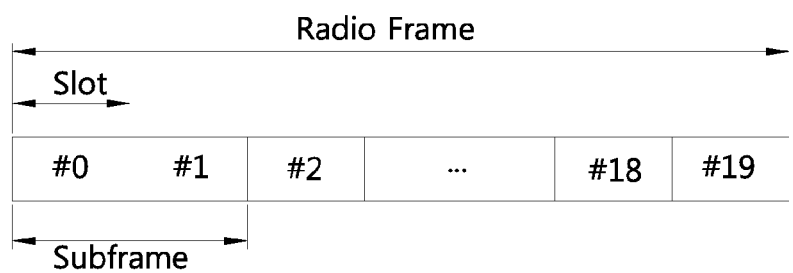
FIG. 2 shows a structure of a radio frame in a 3GPP LTE.

FIG. 2 shows a structure of a radio frame in 3GPP LTE. The radio frame includes ten subframes, and each subframe includes two slots. The slots in the radio frame are numbered with slot numbers of 0 to 19. A time for transmitting one subframe is defined as a transmission time interval (TTI). The TTI is a scheduling unit for transmitting data. For example, one radio frame may have a length of 10 millisecond (ms), one subframe may have a length of 1 ms, and one slot may have a length of 0.5 ms.

The structure of the radio frame is shown for exemplary purposes only, and the number of subframes included in the radio frame or the number of slots included in the subframe may be modified in various manners.

Figure 3:
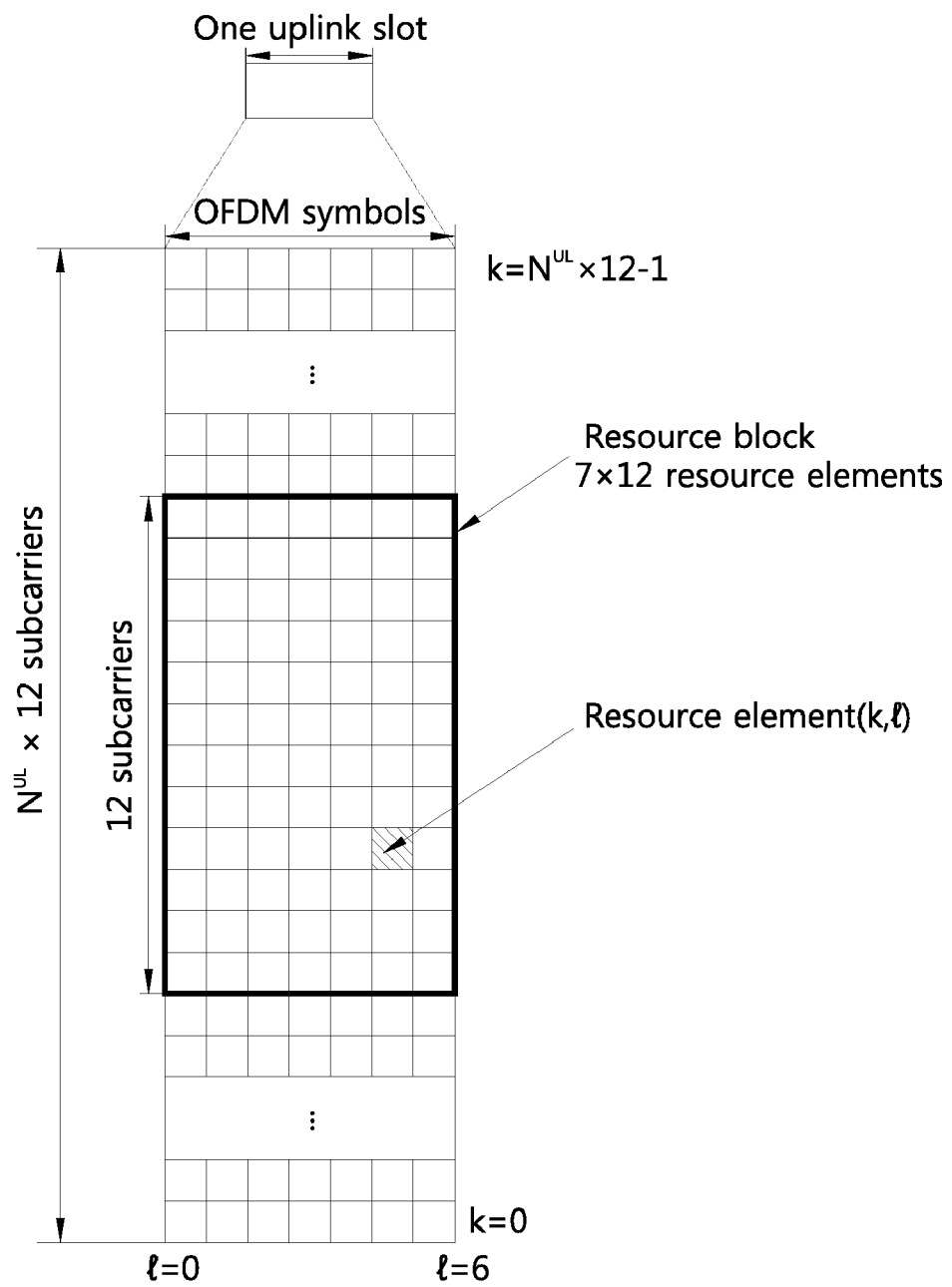
FIG. 3 shows an example of a resource grid for one uplink slot in the 3GPP LTE.

FIG. 3 shows an example of a resource grid for one uplink slot in the 3GPP LTE. An uplink slot includes a plurality of orthogonal frequency division multiplexing (OFDM) symbols in a time domain and $N^{UL}$ resource blocks (RBs) in a frequency domain. The OFDM symbol is for representing one symbol period. The OFDM symbol may use multiple accesses such as OFDMA, SC-FDMA, clustered SC-FDMA, N×SC-FDMA or etc., and may be referred to as an SC-FDMA symbol, an OFDMA symbol or a symbol period according to systems.

The RB includes a plurality of subcarriers in the frequency domain. The number $N^{UL}$ of RBs included in the uplink slot depends on an uplink transmission bandwidth set in a cell. Each element of the resource grid is referred to as a resource element. The resource element on the resource grid may be identified by an index pair (k, l) in the slot. Here, $k(k=0, \ldots, N^{UL} \times 12-1)$ is a subcarrier index in the frequency domain, and $l(l=0, \ldots, 6)$ is a symbol index in the time domain.

It is shown herein exemplarily that one resource block includes 7 OFDM symbols in the time domain and 7×12 resource elements of 12 subcarriers in the frequency domain, but the number of subcarriers and the number of OFDM symbols in the resource block are not limited thereto. Alternatively, the number of OFDM symbols and the number of subcarriers in the resource block may be modified in various manners. Hereinafter, the resource block will denote a general frequency resource. That is, if the resource blocks are different, the frequency resources are also different. The number of OFDM symbols may be varied depending on a length of a cyclic prefix (CP). For example, the number of OFDM symbols is 7 in the case of a normal CP, and 6 in the case of an extended CP.

Figure 4:
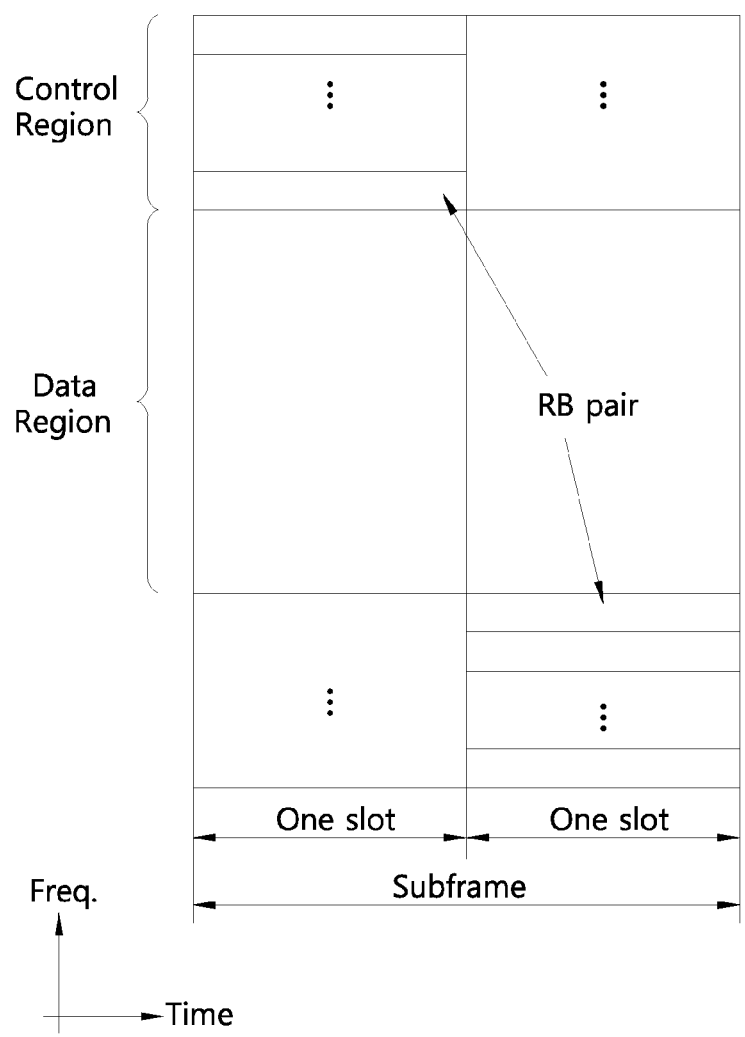
FIG. 4 shows a structure of an uplink subframe in the 3GPP LTE.

FIG. 4 shows a structure of an uplink subframe in the 3GPP LTE. A subframe includes a plurality of SC-FDMA symbols (or OFDM symbols) in the time domain, and a plurality of subcarriers in the frequency domain. The subframe includes two consecutive slots in the time domain. The uplink subframe may be divided in the frequency domain to into a control region and a data region. The control region is allocated with a physical uplink control channel (PUCCH) for carrying uplink control information. The data region is allocated with a physical uplink shared channel (PUSCH) for carrying user data. The PUCCH for one UE is allocated to a pair of RBs in a subframe, and RBs belonging to the pair of RBs occupy different subcarriers in each of two slots. This is called that the RB pair allocated to the PUCCH is frequency-hopped in a slot boundary.

Spectrum aggregation (or called bandwidth aggregation, and subcarrier aggregation) supports a plurality of carriers. The carrier is defined by a bandwidth and a center frequency. The spectrum aggregation is introduced to support an increased throughput, to prevent costs from increasing due to introduction of a broadband radio frequency (RF) device, and to guarantee compatibility with the existing system. For example, if four carriers are allocated as granularity of a carrier unit having a bandwidth of 5 MHz, it is possible to support the maximum bandwidth of 20 MHz.

The spectrum aggregation can be classified into contiguous spectrum aggregation and non-contiguous spectrum. In a frequency domain, contiguous carriers constitute the contiguous spectrum aggregation, but non-contiguous carriers constitute the non-contiguous spectrum. The number of aggregated carriers may be differently set between the downlink and the uplink When the downlink and the uplink have the same number of carriers, it is called symmetric aggregation. On the other hand, when they have different numbers of carriers, it is called asymmetric aggregation.

The multiple carriers may be different in size (i.e., bandwidth) from one another. For example, if five carriers are used for a bandwidth of 70 MHz, they may be configured like 5 MHz carrier (carrier #0)+20 MHz carrier (carrier #1)+20 MHz carrier (carrier #2)+20 MHz carrier (carrier #3)+5 MHz carrier (carrier #4).

Below, the multiple carrier system refers to a system supporting the multiple carriers based on the spectrum aggregation. The multiple carrier system may use the contiguous spectrum aggregation and/or the non-contiguous spectrum aggregation. Also, the multiple carrier system may use either of the symmetric aggregation or the asymmetric aggregation.

Figure 5:
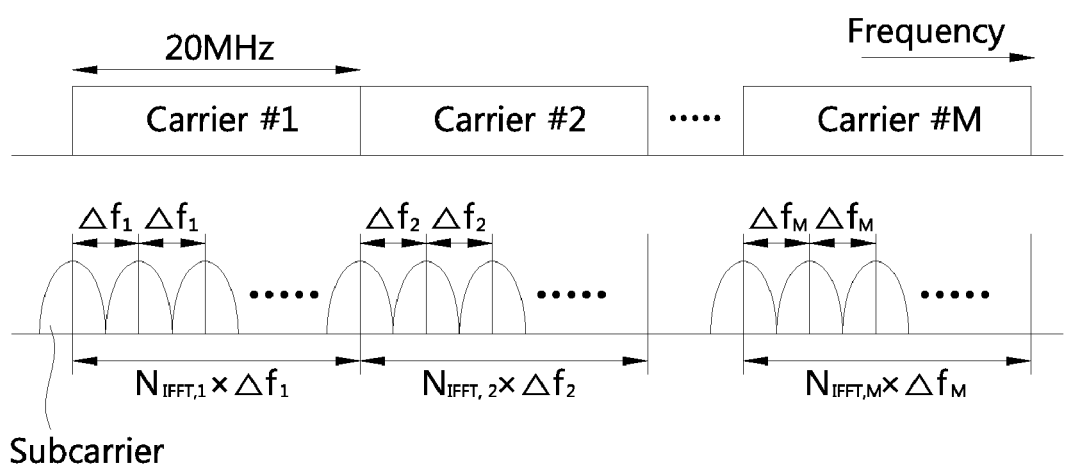
FIG. 5 shows an example of multiple carriers.

FIG. 5 shows an example of multiple carriers. Among M carriers, the $M^{th}$ carrier has a bandwidth of $N_{IFFT,m} \cdot \Delta f_m$. $N_{IFFT,m}$ indicates an inverse fast Fourier transform (IFFT) size of the $M^{th}$ carrier, and $\Delta f_m$ indicates a subcarrier spacing of the $M^{th}$ carrier. The IFFT size and the subcarrier spacing may be different or equal according to the carriers. Also, the $m^{th}$ carrier has a center frequency of $f_{c,m}$, in which the center frequencies of the respective carriers may be arranged with regular or irregular spacing.

The SC-FDMA system is to lower the PAPR and enhance the efficiency of the power amplifier through a discrete Fourier transform (DFT) spread performed in a previous stage of the IFFT.

Figure 6:
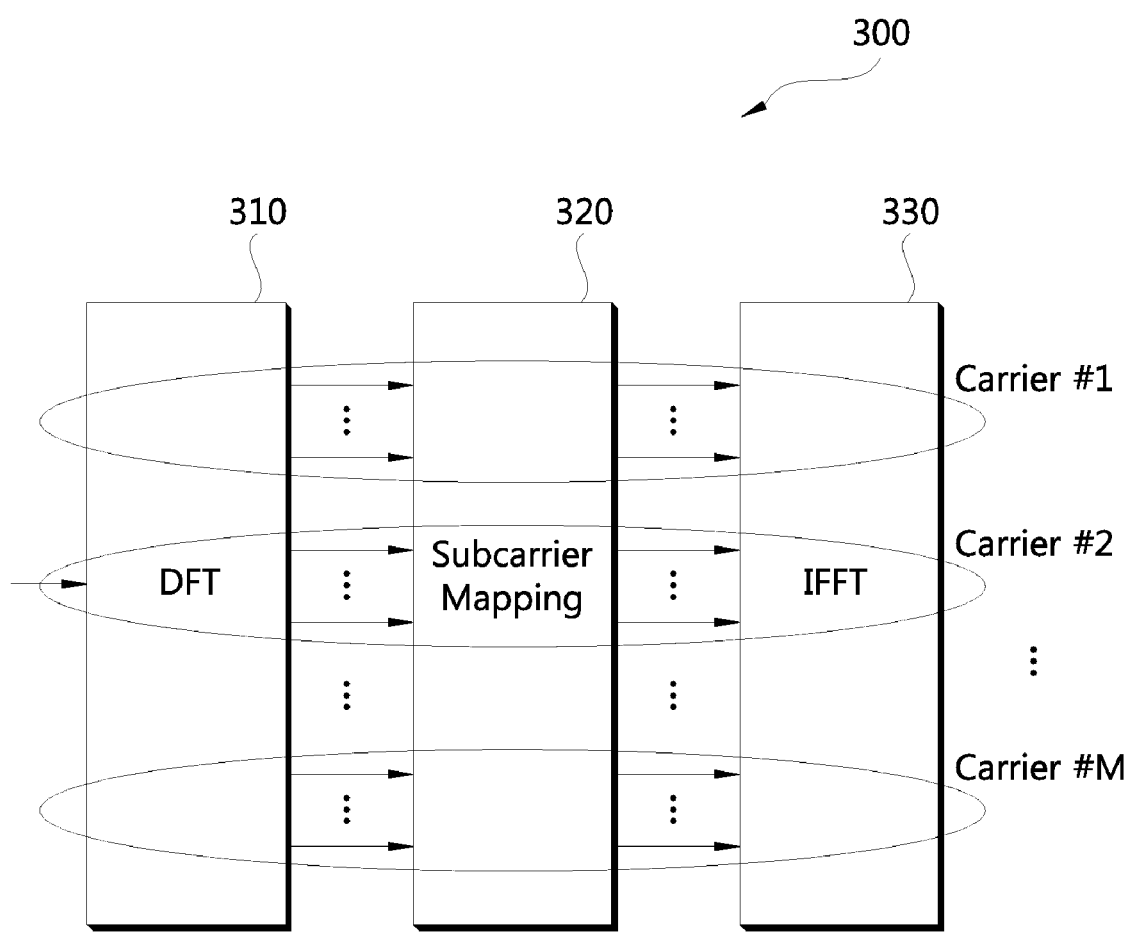
FIG. 6 is a block diagram showing an example of a conventional SC-FDMA signal generator.

FIG. 6 is a block diagram showing an example of a conventional SC-FDMA signal generator. In the multiple carrier system supporting an extended bandwidth, the DFT size and the IFFT size are increased as large as the size of the extended bandwidth. The DFT unit 310 performs the DFT having the size corresponding to the overall, and the subcarrier mapping unit 320 maps a frequency-domain signal undergone the DFT to each subcarrier. Time-domain signals generated by the IFFT unit 330 are transmitted according to respective carriers. The SC-FDMA signal generator 300 is capable of lowering the PAPR by a subcarrier mapping method, but has shortcomings of significantly increasing the complexity of the transmitter since the DFT size and the IFFT size are too large.

Hereinafter, a subband refers to a resource allocation unit allocated to each user, and one or more subbands may correspond to one carrier.

Figure 7:
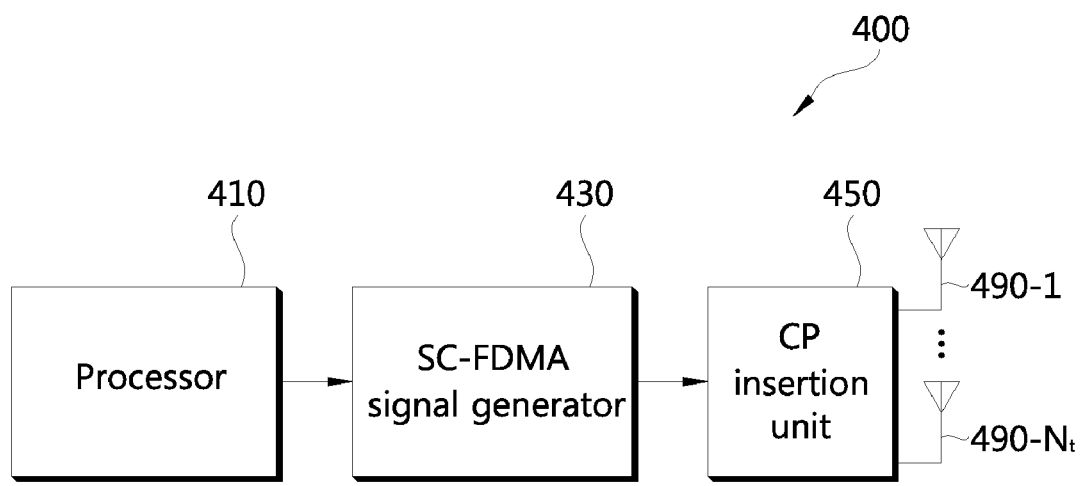
FIG. 7 is a block diagram showing a transmitter for supporting SC-FDMA according to an exemplary embodiment of the present invention.

FIG. 7 is a block diagram showing a transmitter for supporting SC-FDMA according to an exemplary embodiment of the present invention. A transmitter 400 includes a processor 410, an SC-FDMA signal generator 430, and a CP insertion unit 450. The processor 410 processes information bits and generates data symbols. The processor 410 generates data symbols having a value in the form of a complex number by performing channel coding and mapping based on modulation such as binary phase shift keying (BPSK), quadrature phase shift keying (QPSK) and m-quadrature amplitude modulation (m-QAM). The data processor 410 may include a channel encoder (not shown) for performing the channel coding, and a mapper (not shown) for performing the mapping. Alternatively, the data processor 410 may include a plurality of channel encoders and a plurality of mappers. Also, the processor 410 may generate a control sequence corresponding to a control signal and/or a reference signal on the basis of a base sequence. The base sequence may use a constant amplitude zero auto-correlation (CAZAC) sequence or a pseudo-noise (PN) sequence having a good PAPR property. The control sequence can be obtained in various manners such as multiplication, transformation, cutting, circular shift, etc, of the base sequence, which will be described later in more detail.

The SC-FDMA signal generator 430 spreads user data with discrete Fourier transform (DFT), maps it to the subcarrier, and performs inverse fast Fourier transform (IFFT) to thereby generate time-domain signals (referred to as SC-FDMA symbols). The SC-FDMA signal generator 430 may perform the IFFT after the subcarrier mapping without performing the DFT spread with regard to the control sequence. Since the control sequence can be regarded as the DFT-spread sequence if it has a good PAPR property, there is no need of performing the DFT spread again. The SC-FDMA signal generator 430 can perform the IFFT independently according to respective transmit antennas, of which a more detailed structure will be described later. The frequency-domain symbols spread with DFT for the subcarrier mapping can be mapped by a subband unit. The subbands may be contiguous or non-contiguous.

The CP insertion unit 450 inserts a cyclic prefix (CP) in the SC-FDMA symbols, and the SC-FDMA symbols in which the CP is inserted is transmitted through Nt transmit antennas 490-1, ..., 490-Nt.

The SC-FDMA signal generator 430 supports multiple carriers. If there are a plurality of carriers in a system bandwidth, the following several cases may occur depending on the number M of carriers and the number Nt of transmit antennas.

First, if the number M of carriers is equal to the number Nt of transmit antennas, the carriers and the transmit antennas can be mapped at 1:1. Otherwise, a plurality of carriers may be mapped to one transmit antenna according to channel states of the carrier or the transmit antenna.

Second, if the number Nt of transmit antennas is less than the number M of carriers, at least one transmit antenna may be mapped to a plurality of carriers. For example, assume that K(K<M) carriers are mapped to one transmit antenna. Although the PAPR becomes higher due to K carriers, the transmit antenna is determined according to a certain reference, and data of K carriers is transmitted through the determined transmit antenna. The other antennas are used for transmitting data of other carriers. The certain reference may be based on signal-to-interference plus noise ratio (SINR). For instance, K carriers may be mapped to the transmit antenna having the highest SINR, and the other carriers may be mapped to other transmit antennas.

Third, if the number Nt of transmit antennas is more than the number M of carriers, the transmit antennas may be selected to be respectively mapped with the carriers. Also, to achieve diversity gain, every carrier may be mapped the transmit antennas may be mapped by changing the transmit antennas.

Below, various structures of the SC-FDMA signal generator in the multiple carrier system will be described. Here, it is omitted for clarity that a subcarrier mapper for the subcarrier mapping is arranged between the DFT and the IFFT, but various types of the subcarrier mapping may be performed before implemented the IFFT after the DFT spread.

Figure 8:
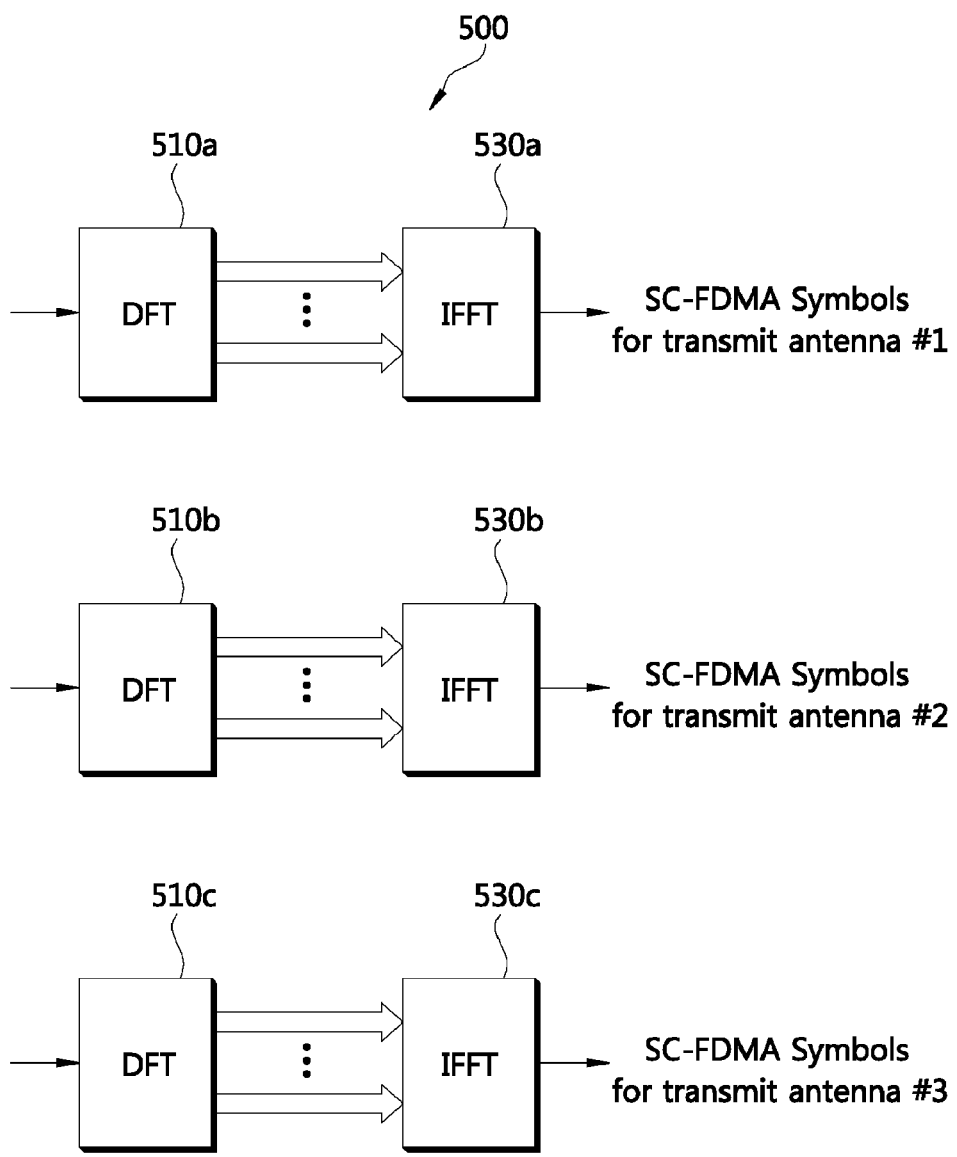
FIG. 8 is a block diagram showing an SC-FDMA signal generator according to an exemplary embodiment of the present invention.

FIG. 8 is a block diagram showing an SC-FDMA signal generator according to an exemplary embodiment of the present invention. For clarity, suppose that the entire system bandwidth is allocated to three carriers and the transmitter includes three transmit antennas.

The transmit antennas use different carriers from one another. User data for the respective transmit antennas independently undergo the DFT and the IFFT and are transmitted through the respective transmit antennas. The control sequence may independently undergo only the IFFT and be transmitted through the respective transmit antennas. An SC-FDMA signal generator 500 includes a first DFT unit 510a, a second DFT unit 510b, a third DFT unit 510c, a first IFFT unit 530a, a second IFFT unit 530b, and a third IFFT unit 530c. SC-FDMA symbols for the first transmit antenna are generated through the first DFT unit 510a and the first IFFT unit 530a, and transmitted onto the first carrier. SC-FDMA symbols for the second transmit antenna are generated through the second DFT unit 510b and the second IFFT unit 530b, and transmitted onto the second carrier. SC-FDMA symbols for the third transmit antenna are generated through the third DFT unit 510c and the third IFFT unit 530c, and transmitted onto the third carrier. The subcarrier mapping between the DFT and the IFFT is performed by a contiguous or non-contiguous subband unit, but the technical features of the present invention are not limited to the subcarrier mapping.

Thus, the DFT and/or IFFT unit are independently arranged according to the transmit antennas or according to the carriers, so that the low PAPR can be maintained and performance deterioration can be minimized even in the extended bandwidth.

Figure 9:
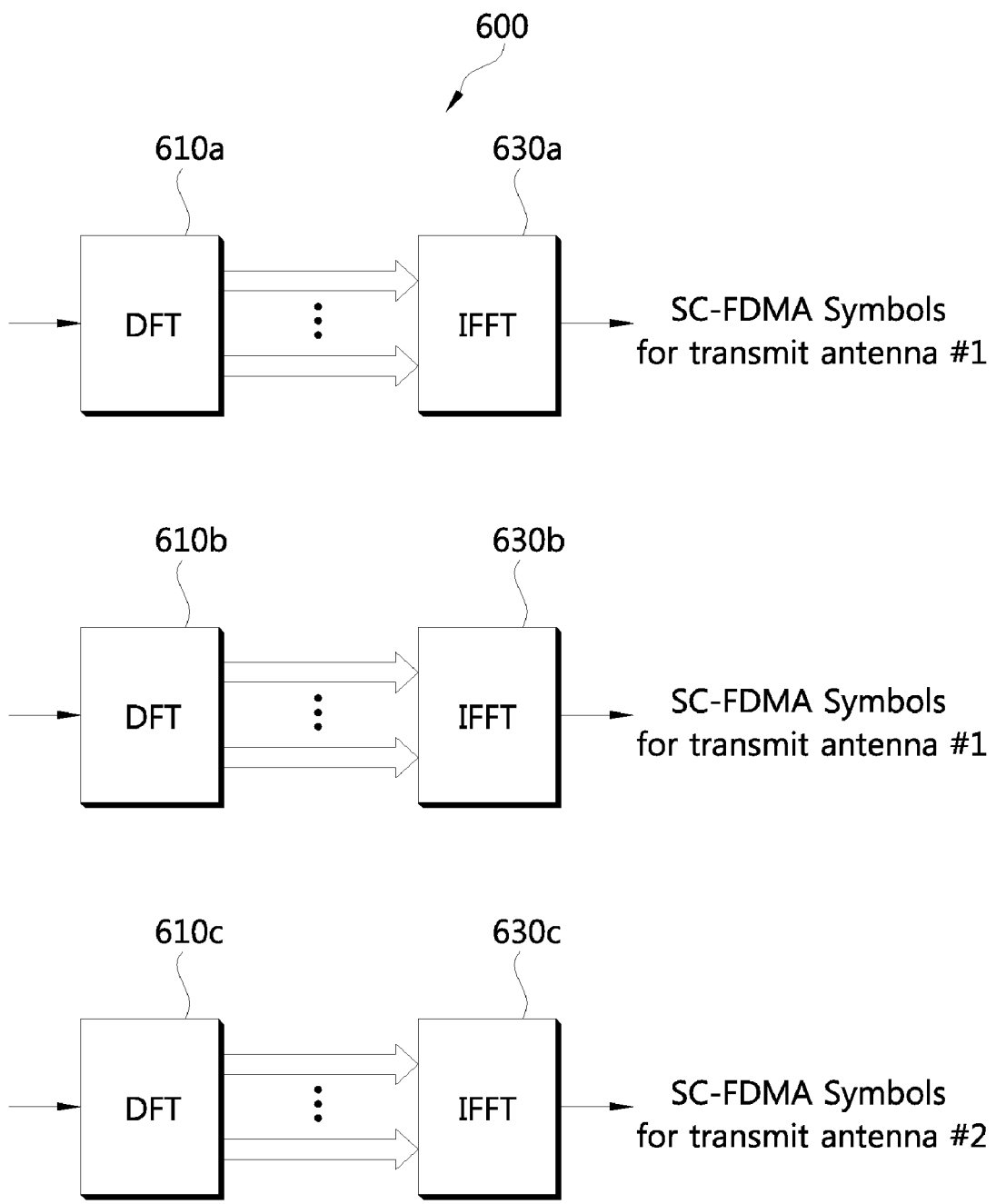
FIG. 9 is a block diagram showing an SC-FDMA signal generator according to another exemplary embodiment of the present invention.

FIG. 9 is a block diagram showing an SC-FDMA signal generator according to another exemplary embodiment of the present invention. Suppose that the entire system bandwidth is allocated to three carriers and the transmitter includes two transmit antennas. A first transmit antenna uses two carriers, and a second transmit antenna uses the other one. User data for the respective transmit antennas independently undergo the DFT and the IFFT and are transmitted through the respective transmit antennas. The control sequence may independently undergo only the IFFT and be transmitted through the respective transmit antennas. An SC-FDMA signal generator 600 includes a first DFT unit 610a, a second DFT unit 610b, a third DFT unit 610c, a first IFFT unit 630a, a second IFFT unit 630b, and a third IFFT unit 630c. Symbols spread by the first DFT unit 610a experience the first IFFT unit 630a and are transmitted onto the first carrier via the first transmit antenna. Symbols spread by the second DFT unit 610b experience the second IFFT unit 630b and are transmitted onto the second carrier via the first transmit antenna. Symbols spread by the third DFT unit 610c experience the third IFFT unit 630c and are transmitted onto the third carrier via the second transmit antenna.

Figure 10:
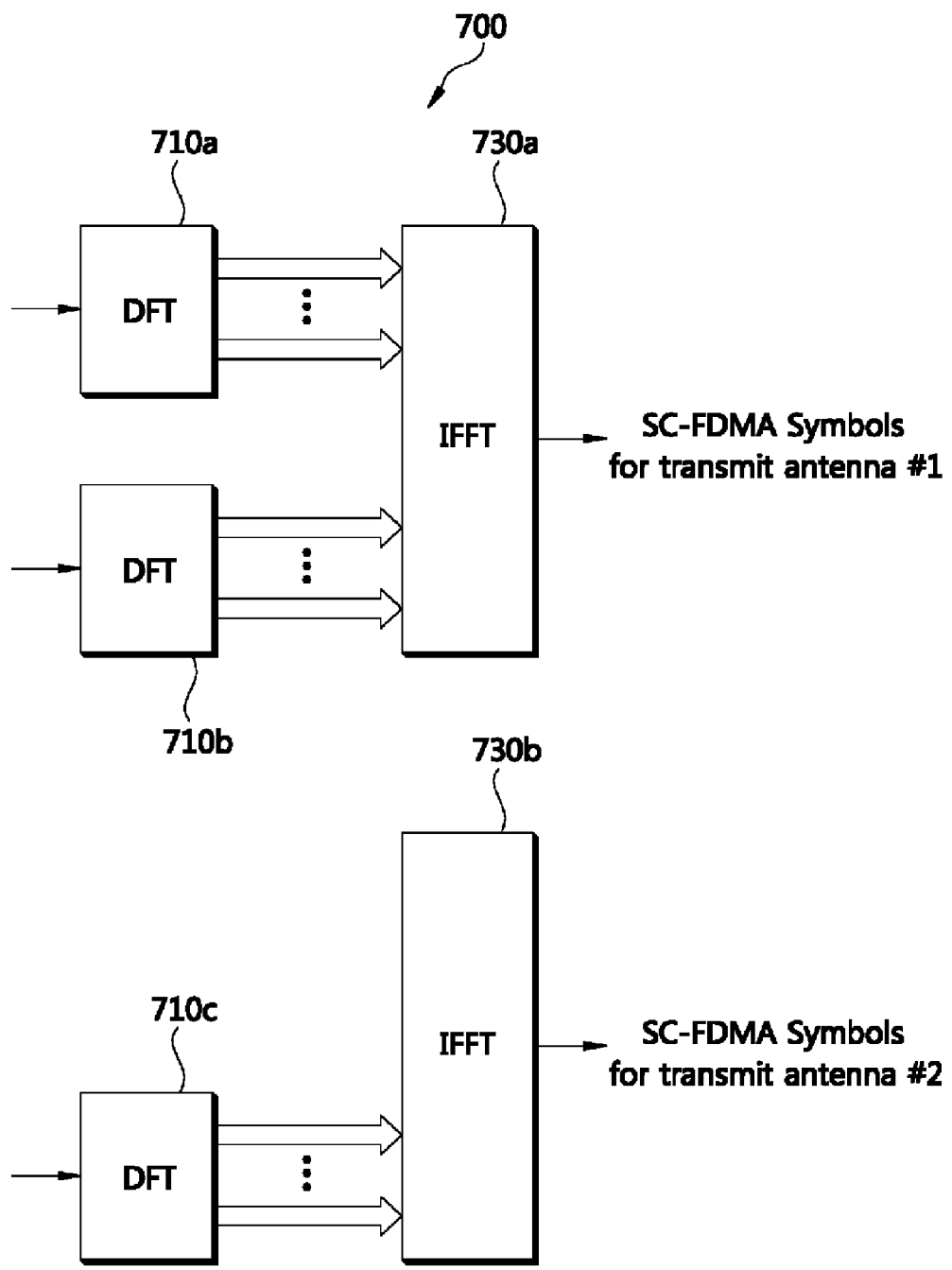
FIG. 10 is a block diagram showing an SC-FDMA signal generator according to still another exemplary embodiment of the present invention.

FIG. 10 is a block diagram showing an SC-FDMA signal generator according to still another exemplary embodiment of the present invention. Suppose that the entire system bandwidth is allocated to two carriers and the transmitter includes two transmit antennas. A first transmit antenna uses a first carrier, and a second transmit antenna uses a second carrier. The transmit antennas use different carriers, respectively. The IFFT is independently performed with respect to each transmit antenna. At this time, different DFT spread symbols may input to one IFFT. The control sequence may independently undergo only the IFFT and be transmitted through the respective transmit antennas. An SC-FDMA signal generator 700 includes a first DFT unit 710a, a second DFT unit 710b, a third DFT unit 710c, a first IFFT unit 730a, and a second IFFT unit 730b. That is, the number of IFFT units 730a and 730b is equal to the number of transmit antennas, but the number of to DFT units 710a, 710b and 710c is larger than the number of transmit antennas. Symbols spread by the first DFT unit 710a and the second DFT unit 710b experience the first IFFT unit 730a and are transmitted onto the first carrier via the first transmit antenna. Symbols spread by the third DFT unit 710c experience the second IFFT unit 730b and are transmitted onto the second carrier via the second transmit antenna.

Figure 11:
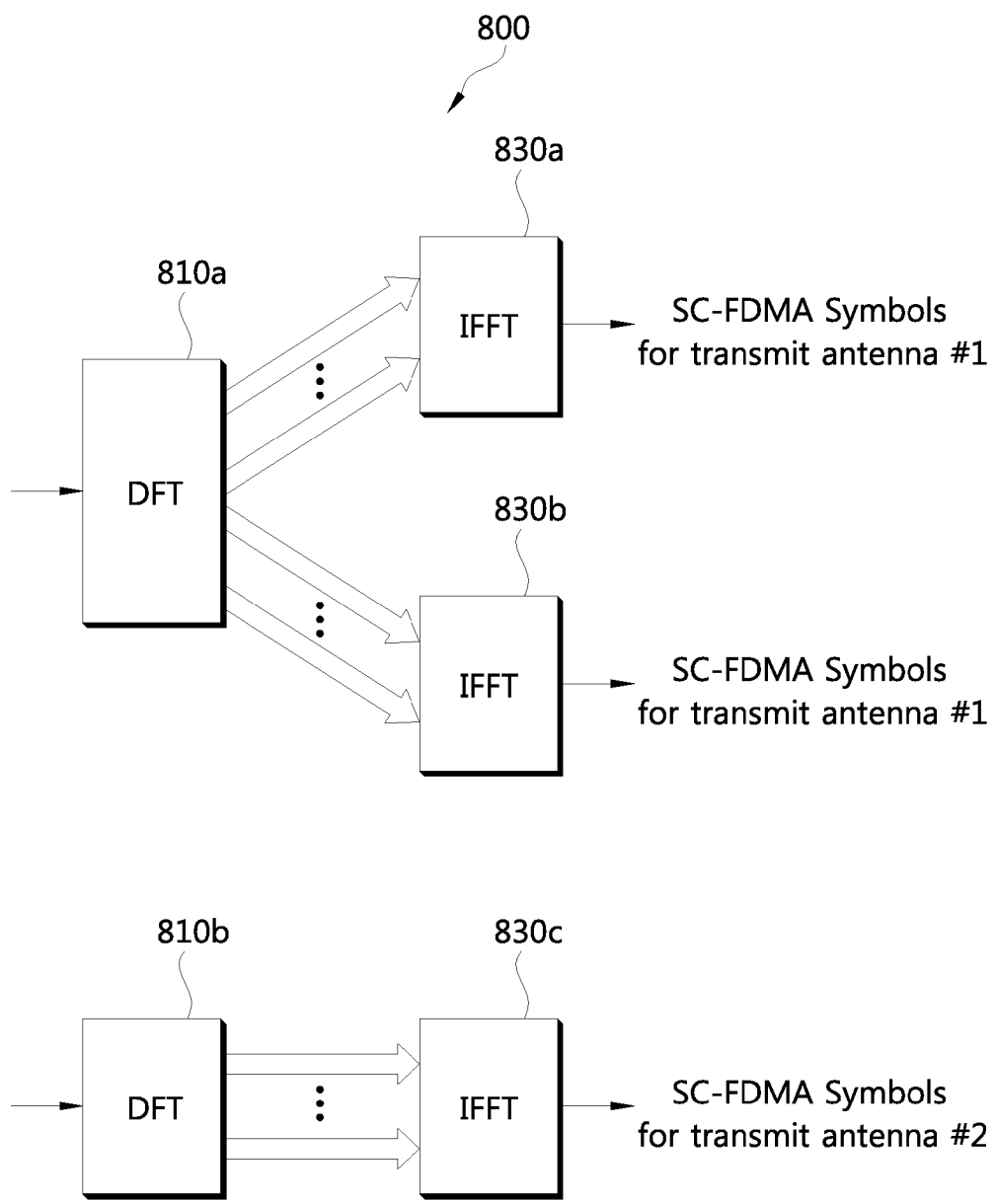
FIG. 11 is a block diagram showing an SC-FDMA signal generator according to still another exemplary embodiment of the present invention.

FIG. 11 is a block diagram showing an SC-FDMA signal generator according to still another exemplary embodiment of the present invention. Suppose that the entire system bandwidth is allocated to three carriers and the transmitter includes two transmit antennas. A first transmit antenna uses two carriers, and a second transmit antenna uses the other one. The IFFT is independently performed with respect to each transmit antenna. The control sequence may independently undergo only the IFFT and be transmitted through the respective transmit antennas. An SC-FDMA signal generator 800 includes a first DFT unit 810a, a second DFT unit 810b, a first IFFT unit 830a, a second IFFT unit 830b, and a third IFFT unit 830c. In other words, the number of IFFT units 830a, 830b and 830c is larger than the number of DFT units 810a and 810b. Symbols spread by the first DFT unit 810a experience the first IFFT unit 830a and the second IFFT unit 830b and are transmitted onto the first carrier and the second carrier via the first transmit antenna. At this time, among the symbols generated by the first DFT unit 810a (referred to as DFT-spread symbols), some may be input to the first IFFT unit 830a, and the others may be input the second IFFT unit 830b. Alternatively, the symbols spread by the first DFT unit 810a may be equally input to the first IFFT unit 830a and the second IFFT unit 830b. Symbols spread by the second DFT unit 810b experience the third IFFT unit 830c and are transmitted onto the second carrier via the second transmit antenna.

Figure 12:
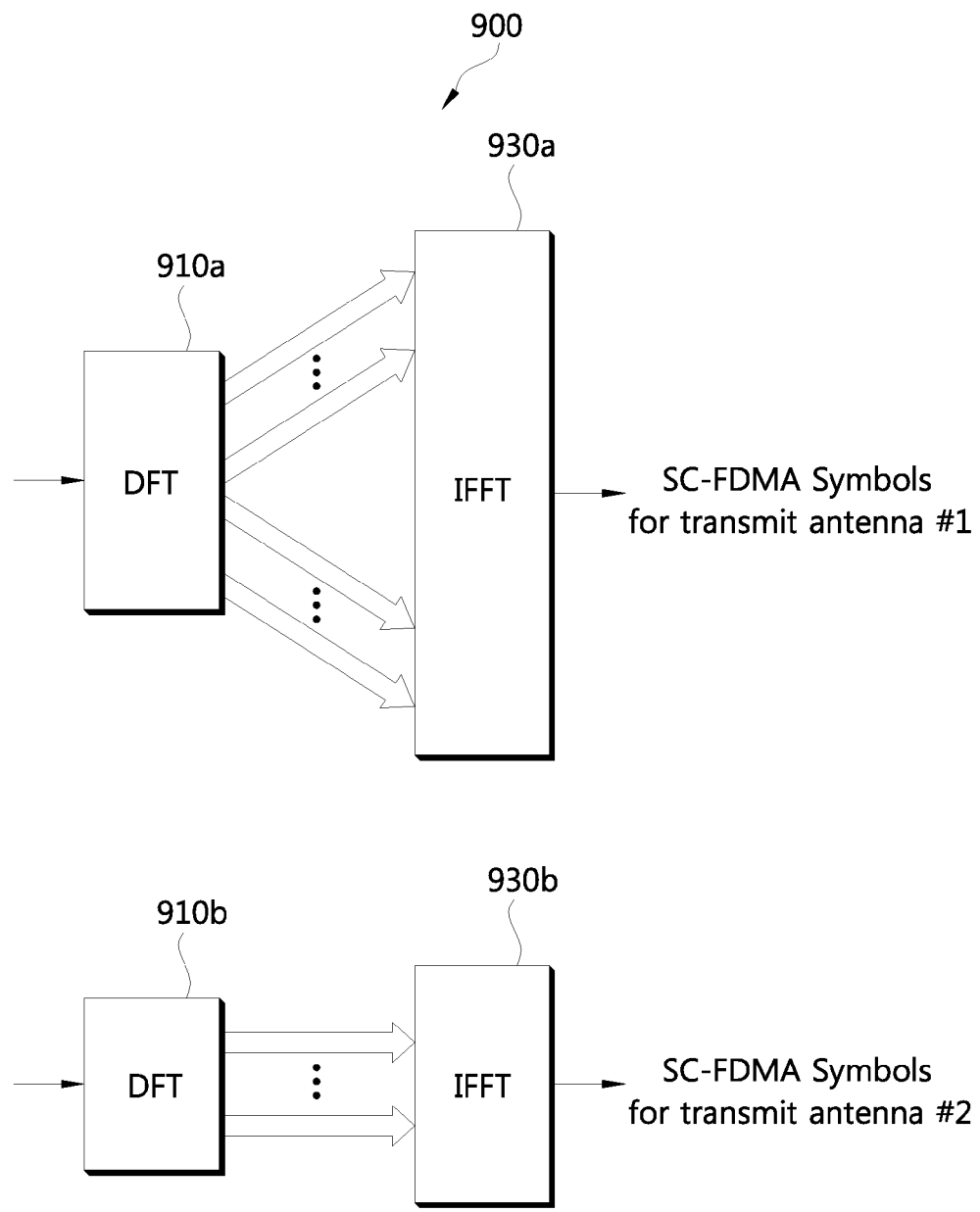
FIG. 12 is a block diagram showing an SC-FDMA signal generator according to still another exemplary embodiment of the present invention.

FIG. 12 is a block diagram showing an SC-FDMA signal generator according to still another exemplary embodiment of the present invention. Suppose that the entire system bandwidth is allocated to two carriers and the transmitter includes two transmit antennas. A first transmit antenna uses a first carrier, and a second transmit antenna uses a second carrier. The IFFT is independently performed with respect to each transmit antenna. The control sequence may independently undergo only the IFFT and be transmitted through the respective transmit antennas. An SC-FDMA signal generator 900 includes a first DFT unit 910a, a second DFT unit 910b, a first IFFT unit 930a, and a second IFFT unit 930b. The SC-FDMA signal generator 900 performs non-contiguous mapping when the subcarrier mapping is performed from the DFT to the IFFT. When symbols spread by the first DFT unit 910a are mapped to the first IFFT unit 930a, the mapping is non-contiguously performed. The non-contiguous mapping may be achieved by a subband unit. For example, if there are three subbands, a first subband and a second subband are mapped to the first carrier and the third subband is mapped to the second carrier. SC-FDMA symbols experienced the first IFFT unit 930a are transmitted onto the first carrier via the first transmit antenna. Symbols spread by the second DFT unit 910b undergo the contiguous subcarrier mapping, experience the second IFFT unit 930b and are transmitted onto the second carrier via the second transmit antenna.

Figure 13:
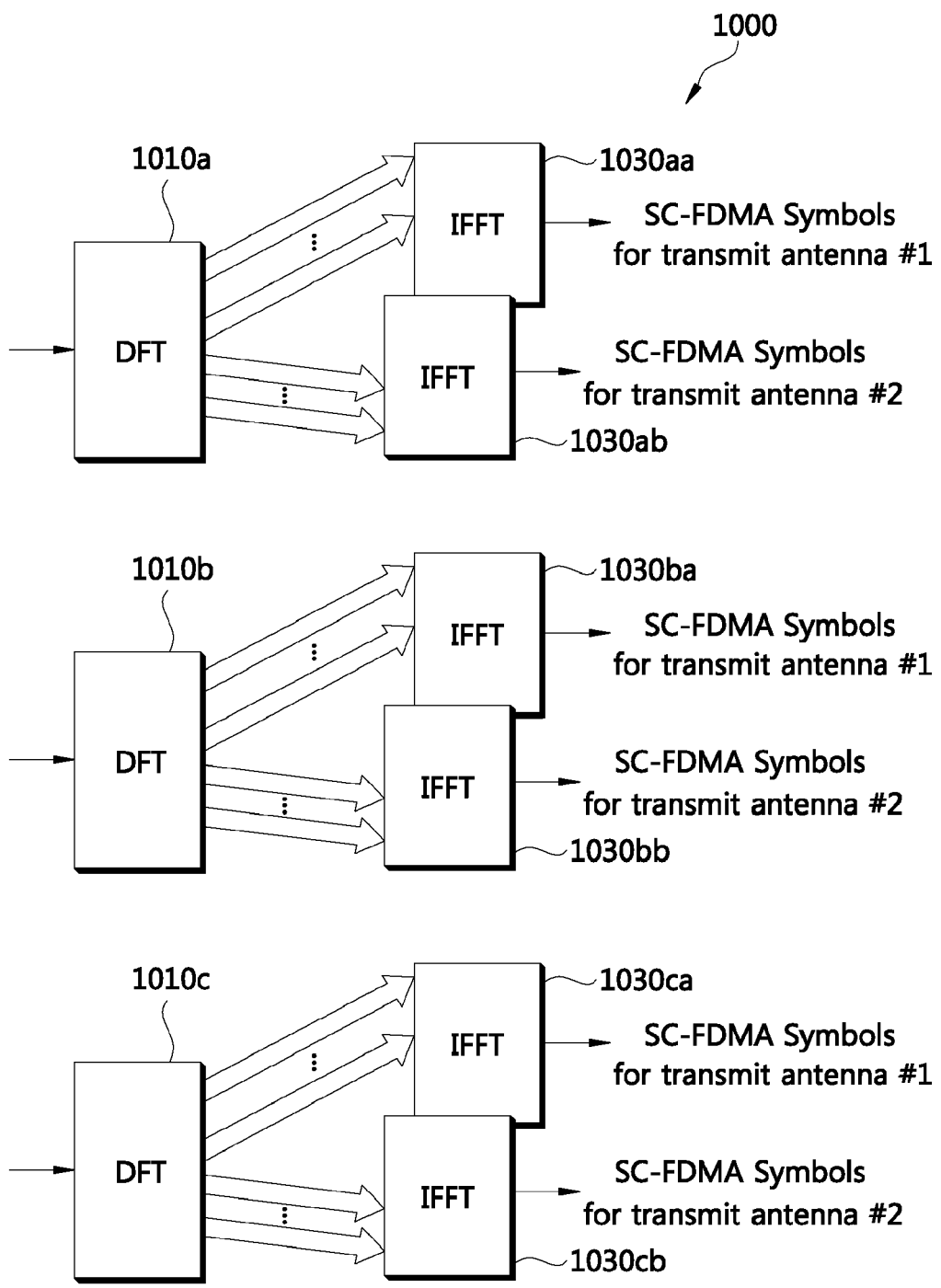
FIG. 13 is a block diagram showing an SC-FDMA signal generator according to still another exemplary embodiment of the present invention.

FIG. 13 is a block diagram showing an SC-FDMA signal generator according to still another exemplary embodiment of the present invention. Suppose that the entire system bandwidth is allocated to three carriers and the transmitter includes two transmit antennas. Each transmit antenna uses all of three carriers. An SC-FDMA signal generator 1000 includes a first DFT unit 1010a, a second DFT unit 1010b, a third DFT unit 1010c, first IFFT units 1030aa and 1030ab for a first carrier, second IFFT units 1030ba and 1030bb for a second carrier, and third IFFT units 1030ca and 1030cb for a third carrier. Symbols spread by the first DFT unit 1010a are divided into two subbands and respectively input to the first IFFT units 1030aa and 1030ab. The control sequence may independently undergo only the IFFT and be transmitted through the respective transmit antennas. SC-FDMA symbols output from the first IFFT 1030aa are transmitted onto the first carrier via the first transmit antenna, and SC-FDMA symbols output from the first IFFT unit 1030ab are transmitted to the first carrier via the second transmit antenna. Symbols spread by the second DFT unit 1010b are divided into two subbands and respectively input to the second IFFT units 1030ba and 1030bb. SC-FDMA symbols output from the second IFFT unit 1030ba are transmitted onto the second carrier via the first transmit antenna, and SC-FDMA symbols output from the second IFFT unit 1030bb are transmitted onto the second carrier via the second transmit antenna. Likewise, symbols spread by the third DFT unit 1010c are divided into two subbands and respectively input to the third IFFT units 1030ca and 1030cb. SC-FDMA symbols output from the second IFFT unit 1030ca are transmitted onto the third carrier via the first transmit antenna, and SC-FDMA symbols output from the third IFFT unit 1030cb are transmitted onto the third carrier via the second transmit antenna. Among six subbands distributed to three carriers, signals mapped to three subbands are transmitted through the first transmit antenna, and signals mapped to the other three subbands are transmitted through the second transmit antenna.

The IFFT is independently performed in every antenna, or the IFFT is independently performed with respect to a data channel and a control channel, so that a degree of freedom for the subcarrier mapping can become higher without increasing the PAPR of the transmitter.

Figure 14:
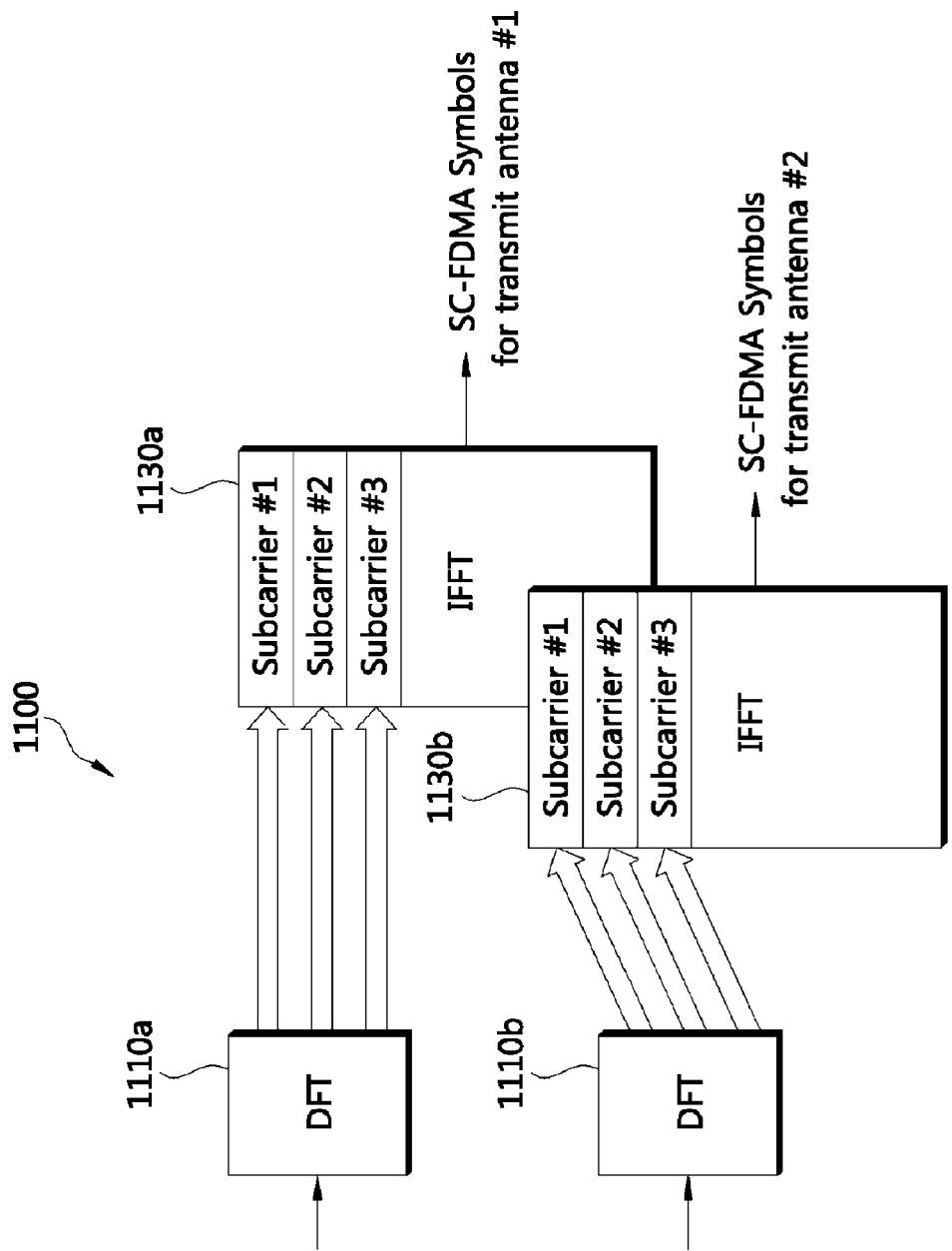
FIG. 14 is a block diagram showing an SC-FDMA signal generator according to still another exemplary embodiment of the present invention.

FIG. 14 is a block diagram showing an SC-FDMA signal generator according to still another exemplary embodiment of the present invention. Suppose that the entire system bandwidth is allocated to one carrier and the transmitter includes two transmit antennas. A first transmit antenna and a second transmit antenna use a first carrier. The to IFFT is independently performed with respect to each transmit antenna. An SC-FDMA signal generator 1100 includes a first DFT unit 1110a, a second DFT unit 1110b, a first IFFT unit 1130a and a second IFFT unit 1130b. Symbols spread by the first DFT unit 1110a experience the first IFFT unit 1130a, and are transmitted onto the carrier via the first transmit antenna. Symbols spread by the second DFT unit 1110b experience the second IFFT unit 1130b and are transmitted onto the carrier via the second transmit antenna. The control sequence may independently undergo only the IFFT and be transmitted through the respective transmit antennas. Subbands allocated to the respective DFT units 1110a and 1110b may be mapped to the same subcarrier. For example, symbols spread by the first DFT unit 1110a are mapped beginning with the subcarrier #1 in the first IFFT unit 1130a, and likewise symbols spread by the second DFT unit 1110b are mapped beginning with the subcarrier #1 in the second IFFT unit 1130b.

Figure 15:
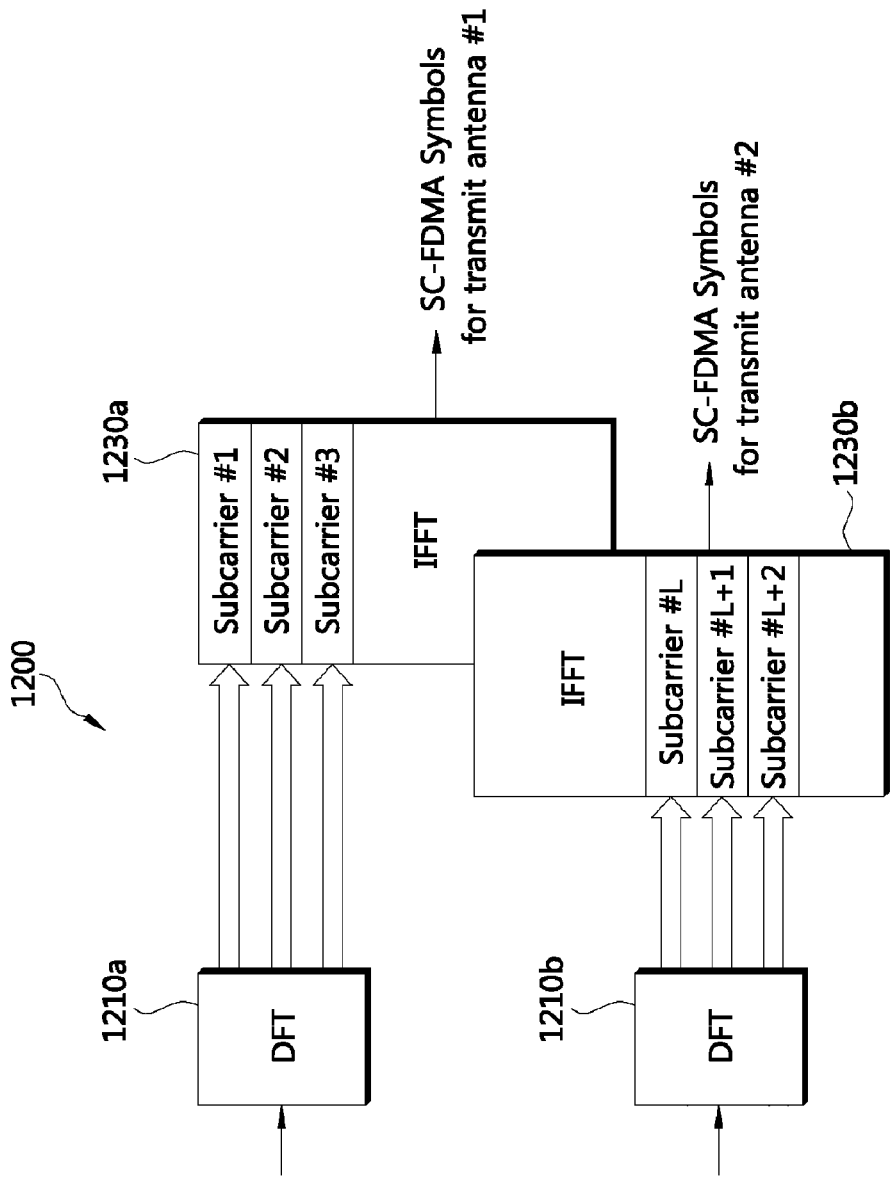
FIG. 15 is a block diagram showing an SC-FDMA signal generator according to still another exemplary embodiment of the present invention.

FIG. 15 is a block diagram showing an SC-FDMA signal generator according to still another exemplary embodiment of the present invention. An SC-FDMA signal generator 1200 includes a first DFT unit 1210a, a second DFT unit 1210b, a first IFFT unit 1230a and a second IFFT unit 1230b. As opposed to the embodiment of FIG. 14, subbands allocated to the respective DFT units 1210a and 1210b may be mapped to different subcarriers. For example, the symbols spread by the first DFT unit 1210a are mapped beginning with the subcarrier #1 in the first IFFT unit 1230a, and the symbols spread by the second DFT unit 1210b are mapped beginning with the subcarrier #L in the second IFFT unit 1230b without overlapping with the subbands allocated to the first DFT unit 1210a.

Figure 16:
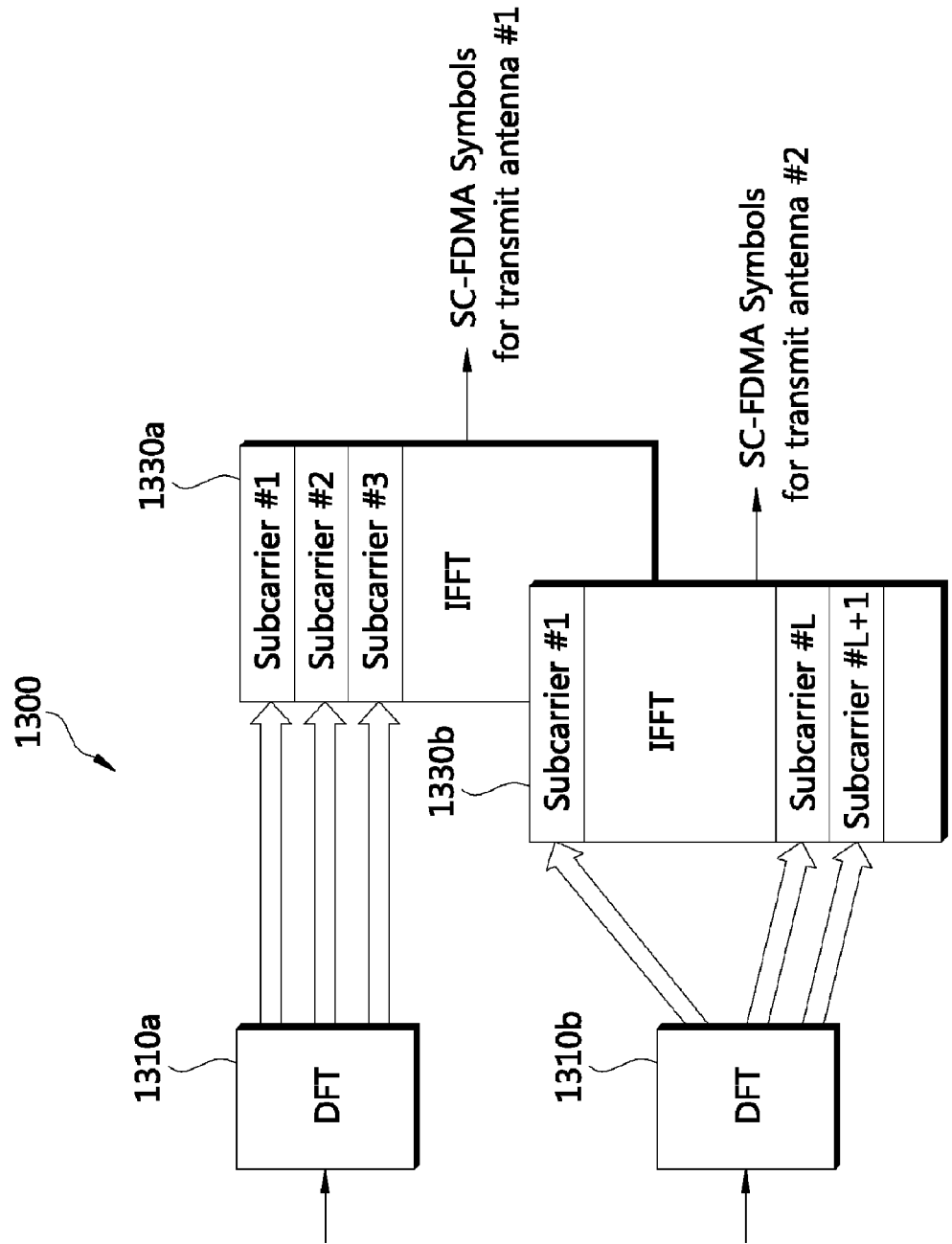
FIG. 16 is a block diagram showing an SC-FDMA signal generator according to still another exemplary embodiment of the present invention.

FIG. 16 is a block diagram showing an SC-FDMA signal generator according to still another exemplary embodiment of the present invention. An SC-FDMA signal generator 1300 includes a first DFT unit 1310a, a second DFT unit 1310b, a first IFFT unit to 1330a and a second IFFT unit 1330b. As opposed to the embodiment of FIG. 14, some of subbands allocated to the respective DFT units 1310a and 1310b may be overlapped with each other and some may be mapped to different subcarriers. For example, the symbols spread by the first DFT unit 1310a are mapped beginning with the subcarrier #1 in the first IFFT unit 1330a, and some of the symbols spread by the second DFT unit 1310b are mapped beginning with the subcarrier #1 in the second IFFT unit 1330b while some are mapped beginning with the subcarrier #L in the second IFFT unit 1330b without overlapping with the subbands allocated to the first DFT unit 1310a.

Figure 17:
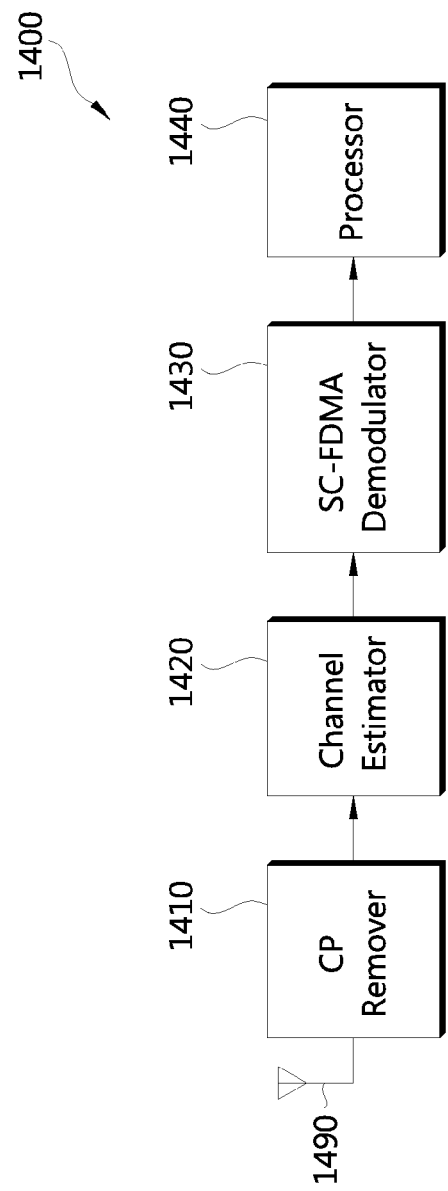
FIG. 17 is a block diagram showing a receiver according to an exemplary embodiment of the present invention.

FIG. 17 is a block diagram showing a receiver according to an exemplary embodiment of the present invention. A receiver 1400 includes a CP remover 1410, a channel estimator 1420, an SC-FDMA demodulator 1430, and a processor 1440. The CP remover 1410 removes a CP from a receiving signal received through a receive antenna 1490. The channel estimator 1420 estimates a channel on the basis of the receiving signal. The channel estimator 1420 can independently estimate a channel of each subband set. The transmitter and the receiver may interchange signaling for identifying the subband set to independently perform the channel estimation, or may use a preset subband set. The SC-FDMA demodulator 1430 performs FFT and inverse discrete Fourier transform (IDFT) for demodulating an SC-FDMA modulated receiving signal. The processor 1440 uses the estimated channel to perform demapping and channel decoding with regard to the demodulated signal, thereby recovering original data.

The channel estimator 1420 performs the channel estimation with respect to a time-domain signal in a previous stage of the SC-FDMA modulator 1430, but this is for exemplary purposes only. Alternatively, the channel estimator 1420 may be arranged in a posterior stage of the SC-FDMA demodulator 1430 or on the way to SC-FDMA demodulation and perform the channel estimation in a frequency domain.

Below, a method of independently performing IFFT to the control sequence and the data symbols will be described more specifically.

Figure 18:
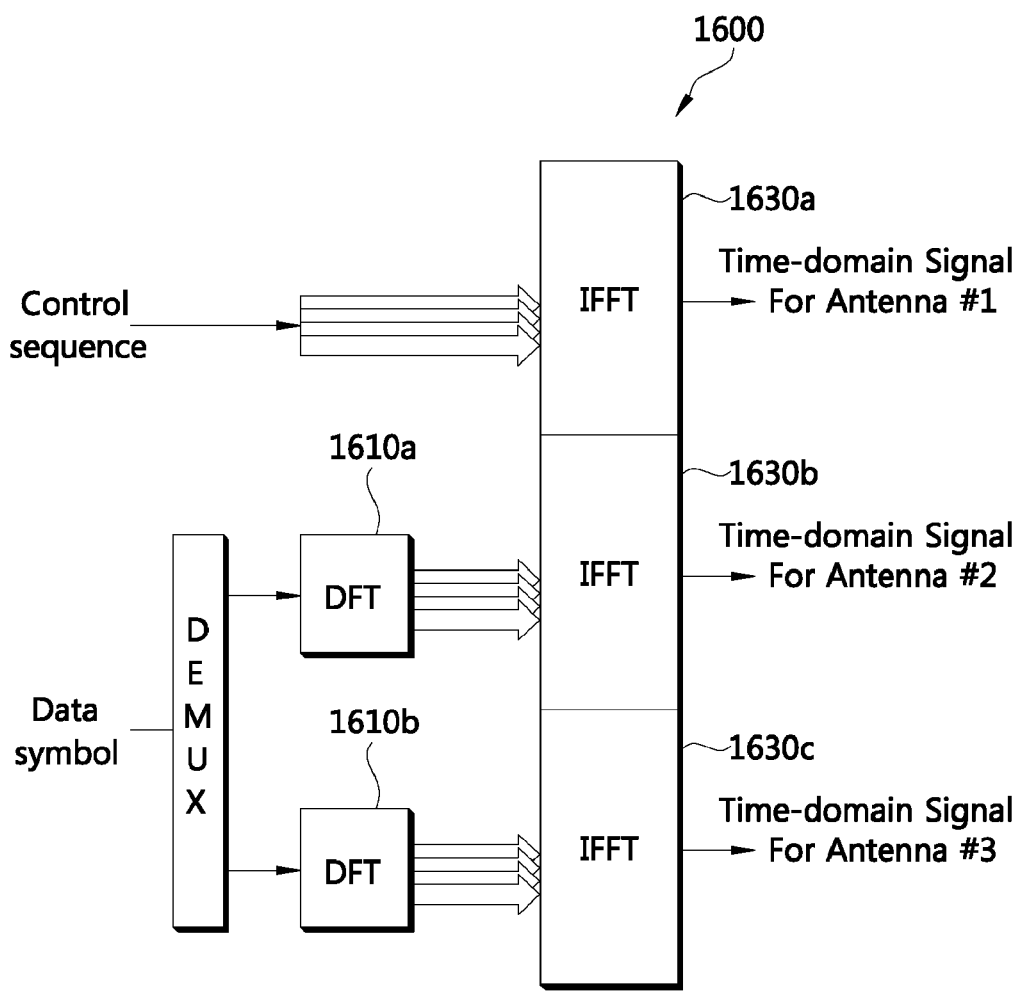
FIG. 18 is a block diagram showing an SC-FDMA signal generator according to an exemplary embodiment of the present invention.

FIG. 18 is a block diagram showing an SC-FDMA signal generator according to an exemplary embodiment of the present invention. Assume that the entire system bandwidth is allocated to three carriers, and the transmitter includes three transmit antennas. The transmit antennas use different carriers, respectively. Data symbols (i.e., user data) for each transmit antenna independently undergo DFT and IFFT, and are transmitted through each transmit antenna. The control sequence may independently undergo only the IFFT and be transmitted through the respective transmit antennas. An SC-FDMA signal generator 1600 includes a first DFT unit 1610a, a second DFT unit 1610b, a first IFFT unit 1630a, a second IFFT unit 1630b, and a third IFFT unit 1630c. In SC-FDMA symbols for a first transmit antenna, the control sequence is generated through the first IFFT unit 1630a and transmitted onto a first carrier. In SC-FDMA symbols for a second transmit antenna, data symbols are generated through the first DFT unit 1610a and the second IFFT unit 1630b and transmitted onto a second carrier. In SC-FDMA symbols for a third transmit antenna, data symbols are generated through the second DFT unit 1610b and the third IFFT unit 1630c and transmitted onto a third carrier.

The control sequence is generated based on a sequence having a good PAPR property and carries a control signal. The control signal includes channel quality indicator (CQI), hybrid automatic repeat request (HARQ), acknowledgement (ACK)/not-acknowledgement (NACK), a rank indicator (RI), precoding matrix indicator (PMI), etc. The control sequence is transformed into a time-domain signal by directly performing IFFT and without DFT spreading.

The control sequence is a sequence used for carrying the control signal, but technical features of the present invention are not limited to the control sequence. Alternatively, it will be appreciated by those skilled in the art that the technical features of the present invention can be applied to another signal generated based on the base sequence, e.g., a synchronization signal, a reference signal, etc.

The control sequence corresponding to control signal is generated based on the base sequence. For example, the base sequence may be represented by $r_{u,v}(n)$. Here, $u \in \{0,1,\ldots,29\}$ is a sequence group number, v is a base sequence number, n is an element index in the range of $0 \leq n \leq M-1$, where M is a length of the base sequence. The base sequence length M may be equal to the number of subcarriers that one demodulation reference signal symbol in a subframe includes. For example, if one resource block includes 12 subcarriers, and three resource blocks are allocated for transmitting data, the base sequence length M is 36. The base sequence $r_{u,v}(n)$ can be expressed as follows.

$$r_{u,v}(n) = e^{jb(n)\pi/4} \qquad [\text{Equation 1}]$$

Definition of the base sequence is varied depending on the group number u.

If the base sequence length M=12, b(n) is defined as shown in the following table.

TABLE 1

| u | b(0), ..., b(11) |
|---|---|
| 0 | −1  1  3 −3  3  3  1  1  3  1 −3  3 |
| 1 |  1  1  3  3  3 −1  1 −3 −3  1 −3  3 |
| 2 |  1  1 −3 −3 −3 −1 −3 −3  1 −3  1 −1 |
| 3 | −1  1  1  1  1 −1 −3 −3  1 −3  3 −1 |
| 4 | −1  3  1 −1  1 −1 −3 −1  1 −1  1  3 |
| 5 |  1 −3  3 −1 −1  1  1 −1 −1  3 −3  1 |
| 6 | −1  3 −3 −3 −3  3  1 −1  3  3 −3  1 |
| 7 | −3 −1 −1 −1  1 −3  3 −1  1 −3  3  1 |
| 8 |  1 −3  3  1 −1 −1 −1  1  1  3 −1  1 |
| 9 |  1 −3 −1  3  3 −1 −3  1  1  1  1  1 |
| 10 | −1  3 −1  1  1 −3 −3 −1 −3 −3  3 −1 |
| 11 |  3  1 −1 −1  3  3 −3  1  3  1  3  3 |
| 12 |  1 −3  1  1 −3  1  1  1 −3 −3 −3  1 |
| 13 |  3  3 −3  3 −3  1  1  3 −1 −3  3  3 |
| 14 | −3  1 −1 −3 −1  3  1  3  3  3 −1  1 |
| 15 |  3 −1  1 −3 −1 −1  1  1  3  1 −1 −3 |
| 16 |  1  3  1 −1  1  3  3  3 −1 −1  3 −1 |
| 17 | −3  1  1  3 −3  3 −3 −3  3  1  3 −1 |
| 18 | −3  3  1  1 −3  1 −3 −3 −1 −1  1 −3 |
| 19 | −1  3  1  3  1 −1 −1  3 −3 −1 −3 −1 |
| 20 | −1 −3  1  1  1  1  3  1 −1  1 −3 −1 |
| 21 | −1  3 −1  1 −3 −3 −3 −3 −3  1 −1 −3 |
| 22 |  1  1 −3 −3 −3 −3 −1  3 −3  1 −3  3 |
| 23 |  1  1 −1 −3 −1 −3  1 −1  1  3 −1  1 |
| 24 |  1  1  3  1  3  3 −1  1 −1 −3 −3  1 |
| 25 |  1 −3  3  3  1  3  3  1 −3 −1 −1  3 |
| 26 |  1  3 −1 −3  3 −3  1 −1 −1  3 −1 −3 |
| 27 | −3 −1 −3 −1 −3  3  1 −1  1  3 −3 −3 |
| 28 | −1  3 −3  3 −1  3  3 −3  3  3 −1 −1 |
| 29 |  3 −3 −3 −1 −1 −3 −1  3 −3  3  1 −1 |

If the base sequence length M=24, b(n) is defined as shown in the following table.

TABLE 2

| u | b(0), ..., b(23) |
|---|---|
| 0  | −1  3  1 −3  3 −1  1  3 −3  3  1  3 −3  3  1  1 −1  1  3 −3  3 −1 −3 |
| 1  | −3  3 −3 −3 −3  1 −3 −3  3 −1  1  1  1  3  1 −1  3 −3 −3  1  3  1  1 −3 |
| 2  |  3 −1  3  3  1  1 −3  3  3  3  3  1 −1  3 −1  1  1 −1 −3 −1 −1  1  3  3 |
| 3  | −1 −3  1  1  3 −3  1  1 −3 −1 −1  1  3  1  3  1 −1  3  1  1 −3 −1 −3 −1 |
| 4  | −1 −1 −1 −3 −3 −1  1  1  3  3 −1  3 −1  1 −1 −3  1 −1 −3 −3  1 −3 −1 −1 |
| 5  | −3  1  1  3 −1  1  3  1 −3  1 −3  1  1 −1 −1  3 −1 −3  3 −3 −3 −3  1  1 |
| 6  |  1  1 −1 −1  3 −3 −3  3 −3  1 −1 −1  1 −1  1  1 −1 −3 −1  1 −1  3 −1 −3 |
| 7  | −3  3  3 −1 −1 −3 −1  3  1  3  1  3  1  1 −1  3  1 −1  1  3 −3 −1 −1  1 |
| 8  | −3  1  3 −3  1 −1 −3  3 −3  3 −1 −1 −1 −1  1 −3 −3 −3  1 −3 −3 −3  1 −3 |
| 9  |  1  1 −3  3  3 −1 −3 −1  3 −3  3  3  3 −1  1  1 −3  1 −1  1  −3  1  1 |
| 10 | −1  1 −3 −3  3 −1  3 −1 −1 −3 −3 −3 −1 −3 −3  1 −1  1  3  3 −1  1  1  3 |
| 11 |  1  3  3 −3 −3  1  3  1 −1 −3 −3  3  3 −3  3  3 −1 −3  3 −1  1 −3  1 |
| 12 |  1  3  3  1  1  1 −1 −1  1 −3  3 −1  1  1 −3  3  3 −1 −3  3 −3 −1 −3 |
| 13 |  3 −1 −1 −1 −1 −3 −1  3  3  1 −1  1  3  3 −1  1  1 −3  1  3 −1 −3  3 |
| 14 | −3 −3  3  1  3  1 −3  3  1  3  1  1  3  3 −1 −1 −3  1 −3 −1  3  1  1  3 |
| 15 | −1 −1  1 −3  1  3 −3  1 −1 −3 −1  3  1  3  1 −1 −3 −3 −1 −3 −3 −3 −1 |
| 16 | −1 −3  3 −1 −1 −1 −1  1  1 −3  3  1  3  3  1 −1  1 −3  1 −3  1  1 −3 −1 |
| 17 |  1  3 −1  3  3 −1 −3  1 −1 −3  3  3  3 −1  1  1  3 −1 −3 — |

TABLE 2-continued

| u | b (0), . . . , b (23) |
|---|---|
| 18 | 1 1 1 1 1 -1 3 -1 1 3 -1 -1 -1 -3 1 -3 -1 1 1 -3 -3 3 1 1 -3 |
| 19 | 1 3 3 1 -1 -3 3 -1 3 3 3 -3 1 -1 1 -1 -3 -1 1 3 3 1 1 -3 -1 3 -3 -3 |
| 20 | -1 -3 3 -3 -3 -3 -1 -1 -3 -1 -3 3 1 3 -3 -1 3 -1 1 -1 3 -3 1 -1 |
| 21 | -3 -3 1 1 -1 1 -1 1 -1 3 1 -3 -1 1 -1 1 -1 -1 3 3 -3 -1 1 -3 |
| 22 | -3 -1 -3 3 1 -1 -3 -1 -3 -3 3 -3 3 -3 -1 1 3 1 -3 1 3 3 -1 -3 |
| 23 | -1 -1 -1 -1 3 3 3 1 3 3 -3 1 3 -1 3 -1 3 3 -3 3 1 -1 3 3 |
| 24 | 1 -1 3 3 -1 -3 3 -3 -1 -1 3 -1 3 -1 -1 1 1 1 1 1 -1 -3 -1 3 — |
| 25 | 1 -1 1 -1 3 -1 3 1 1 -1 -1 -3 1 1 -3 1 3 -3 1 1 -3 -3 -1 -1 |
| 26 | -3 -1 1 3 1 1 -3 -1 -1 -3 3 -3 3 1 -3 3 -3 1 -1 1 -3 1 1 1 |
| 27 | -1 -3 3 3 1 1 3 -1 -3 -1 -1 -1 3 1 -3 -3 -1 3 -3 -1 -3 -1 -3 -1 |
| 28 | -1 -3 -1 -1 1 -3 -1 -1 1 -1 -3 1 1 -3 1 -3 -3 3 1 -1 3 -1 -1 |
| 29 | 1 1 -1 -1 -3 -1 3 -1 3 -1 1 3 1 -1 3 1 3 -3 -3 1 -1 -1 1 3 |

The base sequence $r_{u,v}(n)$ may be varied depending on the sequence group number u and the base sequence number v. Each of the sequence group number u and the base sequence number v in the group may be varied semi-statically or varied at every slot. That the sequence group number u is varied at every slot is called group hopping, and that the base sequence number v in the group is varied at every slot is called sequence group hopping. Whether it is the group hopping or whether it is the sequence hopping may be set by a higher layer of a physical layer. For example, the higher layer may be radio resource control (RCC) for controlling a radio resource between a UE and a network.

The control sequence may use a sequence cyclically shifted from the base sequence. The control sequence is generated by cyclically shifting the base sequence by a certain cyclic shift amount corresponding to a control signal. The base sequence $r_{u,v}(n)$ can be cyclically shifted into a cyclically shifted sequence $r_{u,v}(n, \text{Ics})$ as follows.

$$r_{u,v}(n, I_{CS}) = r_{u,v}(n)\exp\left(\frac{j2\pi I_{CS} n}{12}\right) \quad \text{[Equation 2]}$$

where, '$2\pi \text{Ics}/12$' denotes a cyclic shift (CS) amount, and 'Ics' denotes a CS index for indexing the CS amount ($0 \leq \text{Ics} \leq 12$, Ics is an integer).

The control sequence and the user data independently undergo the IFFT and are respectively transmitted through different transmit antennas, thereby preventing the PAPR from increasing. Also, each IFFT or transmit antenna can be readily applied to a multi carrier system by corresponding to each carrier.

Figure 19:
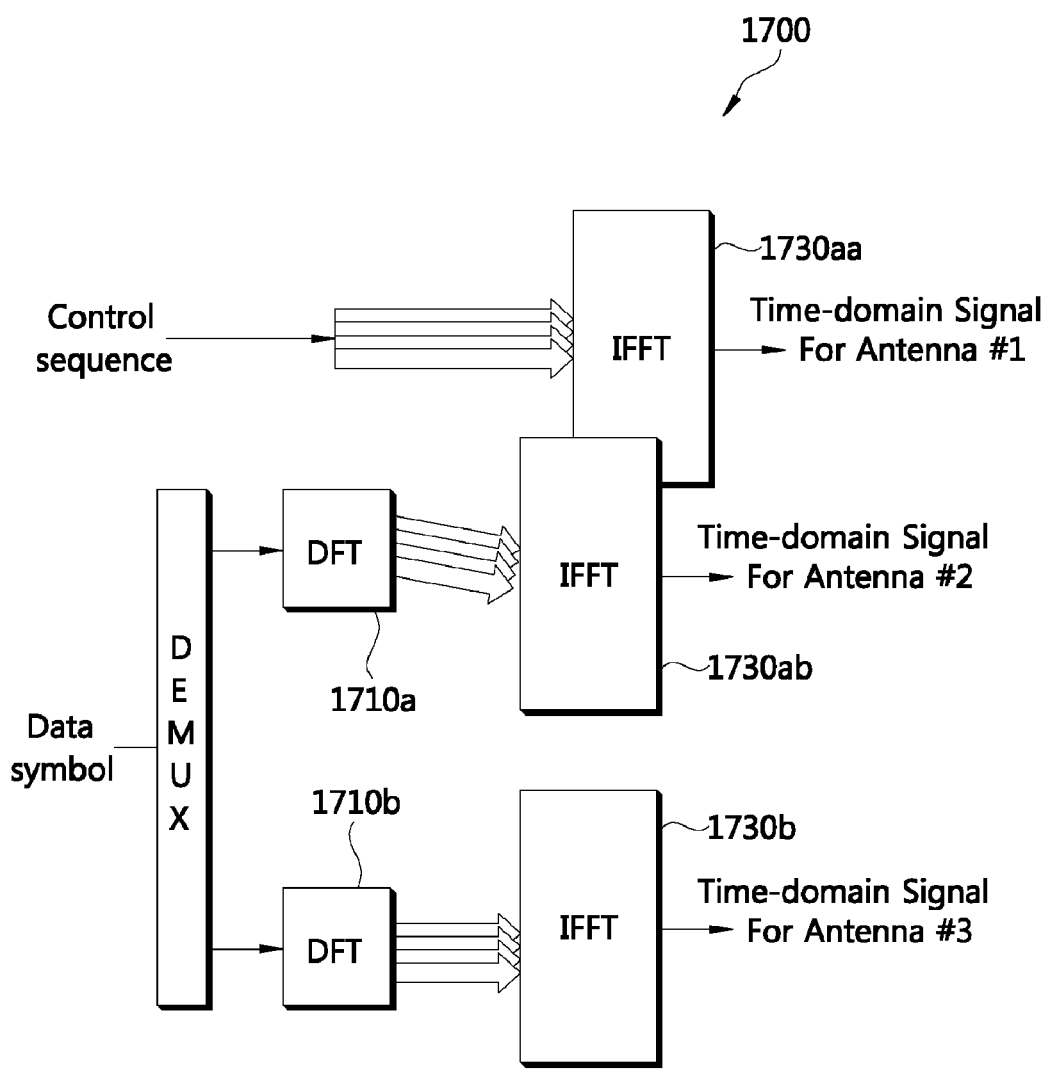
FIG. 19 is a block diagram showing an SC-FDMA signal generator according to still another exemplary embodiment of the present invention.

FIG. 19 is a block diagram showing an SC-FDMA signal generator according to still another exemplary embodiment of the present invention. Assume that the entire system bandwidth is allocated to two carriers, and the transmitter includes three transmit antennas. A first transmit antenna and a second transmit antenna use a first carrier, and a third transmit antenna uses a second carrier. An SC-FDMA signal generator 1700 includes a first DFT unit 1710a, a second DFT unit 1710b, IFFT units 1730aa and 1730ab for the to first carrier, and an IFFT unit 1730b for the second carrier. In SC-FDMA symbols for the first transmit antenna, the control sequence is generated through the IFFT unit 1730aa and transmitted onto the first carrier. Data symbols spread by the first DFT unit 1710a undergo the IFFT performed by the IFFT unit 1730ab and are transmitted onto the first carrier through the second transmit antenna. The control sequence and the data symbols transmitted onto the first carrier may be allocated with the same subbands or different subbands. Data symbols spread by the second DFT unit 1710b are input to the IFFT unit 1730b. The SC-FDMA symbols output from the IFFT unit 1730b are transmitted onto a second carrier through the third transmit antenna.

The control sequence and the data symbols independently undergo the IFFT and are respectively transmitted through different transmit antennas.

In the 3GPP LTE, there are two physical channels of a PUCCH and a PUSCH. The PUCCH is used in carrying a control signal, and the PUSCH is used in carrying user data or both the user data and the control signal. The existing 3GPP LTE does not take the multiple carriers into account, and prevents simultaneous transmission of the PUSCH and the PUCCH to maintain the single carrier property. Accordingly, it will be exemplarily described that the foregoing embodiments are applied to the transmission of the PUSCH and the PUCCH in the multiple carrier system.

Figure 20:
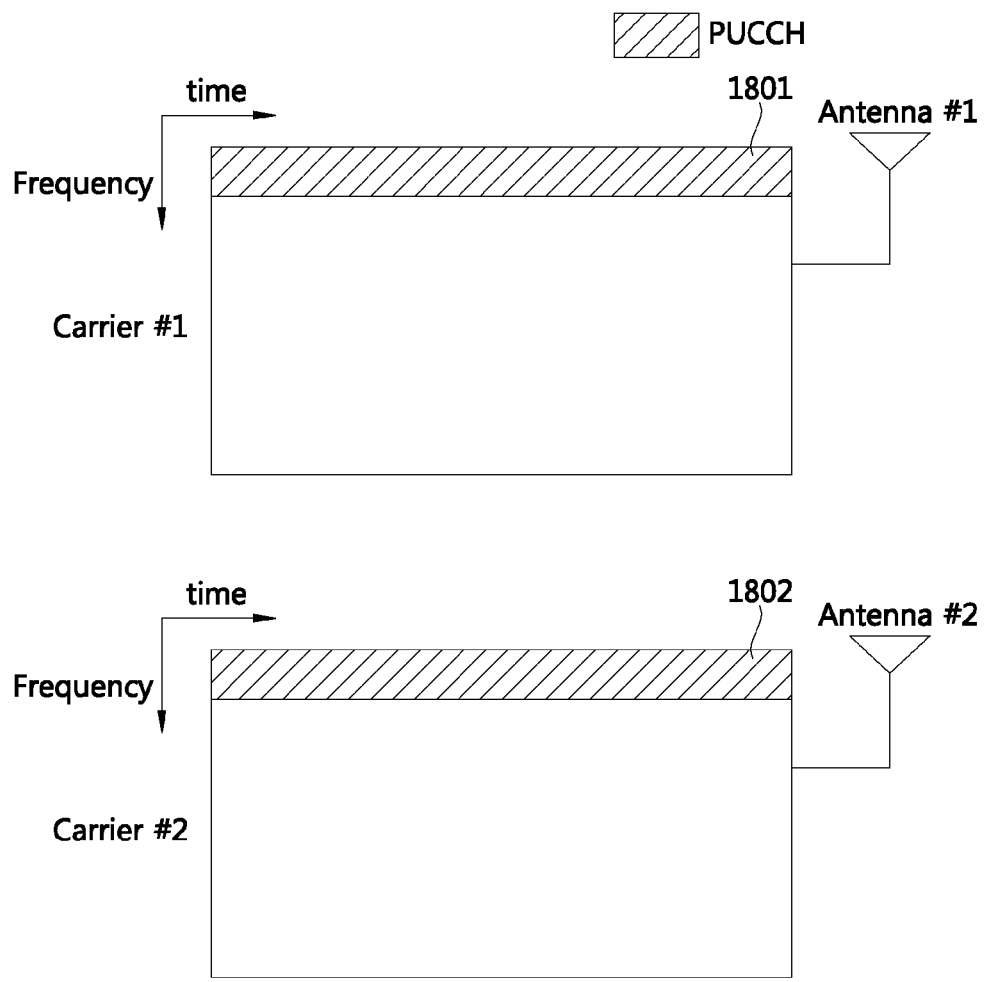
FIG. 20 shows an example of PUCCH transmission.

FIG. 20 shows an example of PUCCH transmission. A first PUCCH 1801 is transmitted onto a first carrier through a first antenna, and a second PUCCH 1802 is transmitted onto a second carrier through a second antenna. Here, the first PUCCH 1801 and the second PUCCH 1802 are allocated to one time/frequency domain, but may be alternatively allocated to different time/frequency domains, respectively. A plurality of PUCCHs are transmitted onto different carriers via different antennas, respectively. The plurality of PUCCHs are transmitted through different subframes, respectively. Below, to transmission of different subframes refers to that a first subframe to which the first PUCCH belongs and a second subframe to which the second PUCCH belongs are transmitted to different antennas and/or different carriers, respectively.

Figure 21:
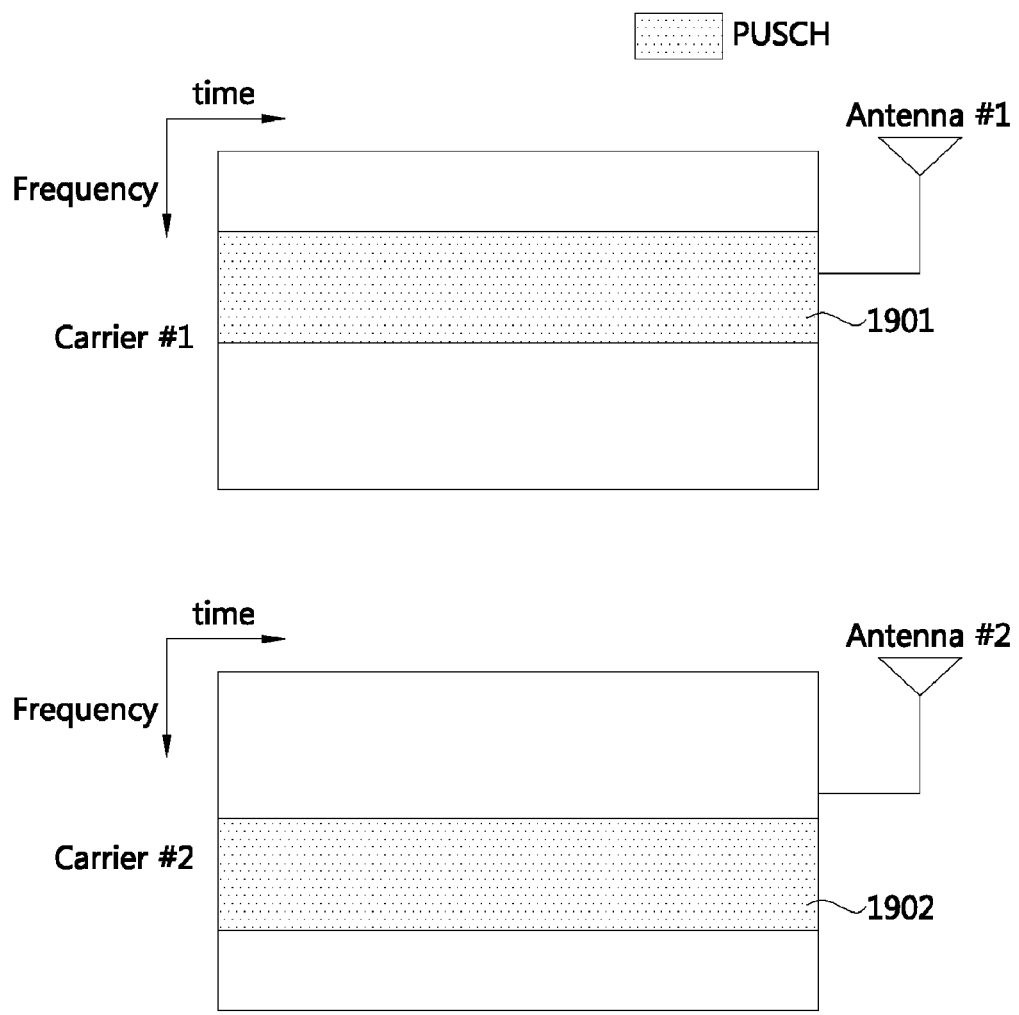
FIG. 21 shows an example of PUSCH transmission.

FIG. 21 shows an example of PUSCH transmission. A first PUSCH 1901 is transmitted onto the first carrier through the first antenna, and a second PUSCH 1902 is transmitted onto the second carrier through the second antenna. A plurality of PUSCHs are transmitted through different subframes, respectively.

Figure 22:
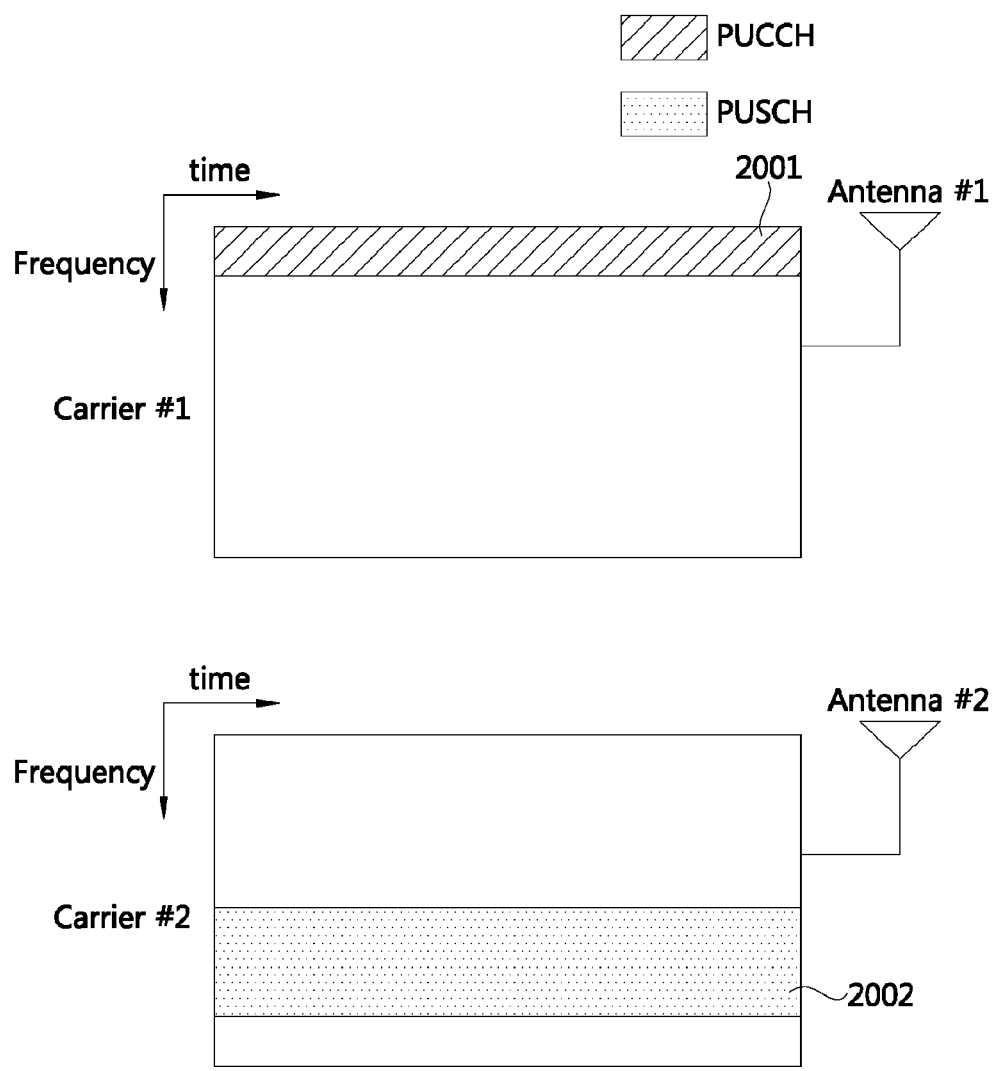
FIG. 22 shows an example of PUCCH and PUSCH transmission.

FIG. 22 shows an example of PUCCH and PUSCH transmission. A PUCCH 2001 is transmitted onto the first carrier through the first antenna, and a PUSCH 2002 is transmitted onto the second carrier through the second antenna. The PUCCH 2201 and the PUSCH 2002 are transmitted through different subframes, respectively.

Figure 23:
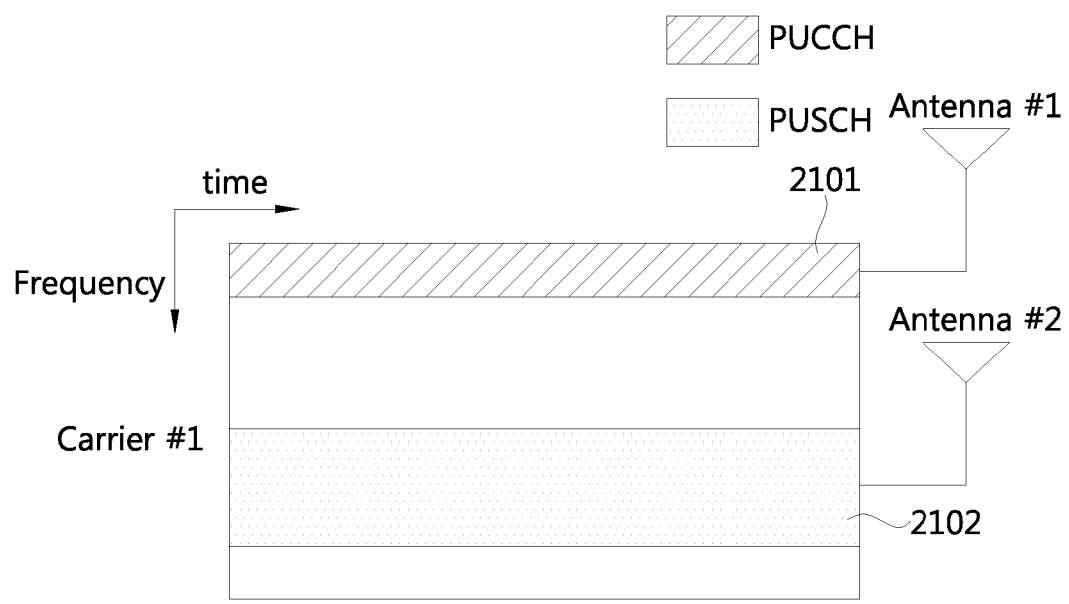
FIG. 23 shows another example of PUCCH and PUSCH transmission.

FIG. 23 shows another example of PUCCH and PUSCH transmission, in which a PUCCH and a PUSCH in one subframe are simultaneously transmitted onto one carrier. The PUCCH 2101 is transmitted through the first antenna, and the PUSCH 2102 is transmitted through the second antenna. The PUCCH 2101 and the PUSCH 2102 are transmitted onto one carrier through different antennas.

Figure 24:
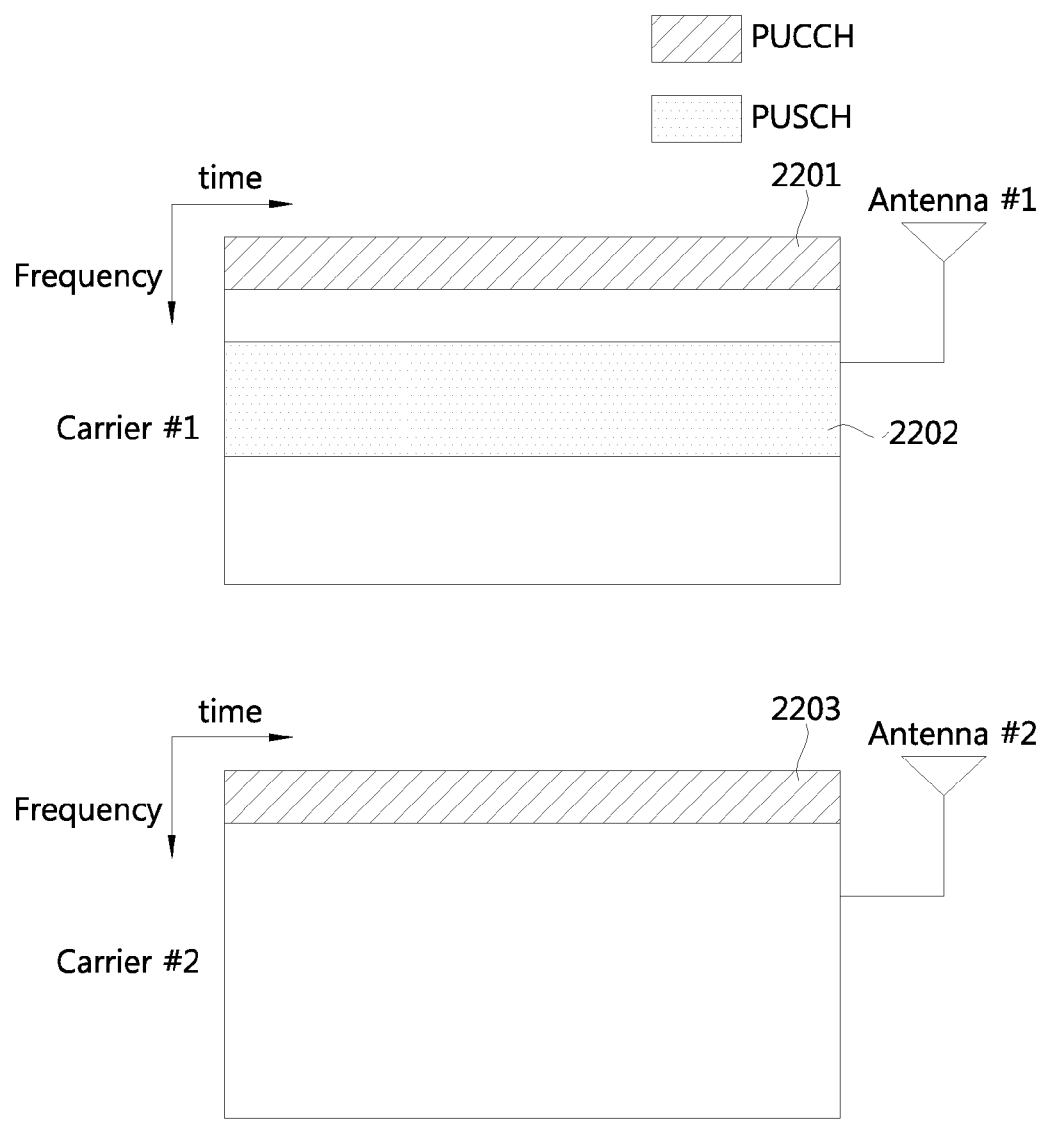
FIG. 24 shows still another example of PUCCH and PUSCH transmission.

FIG. 24 shows still another example of PUCCH and PUSCH transmission. In one subframe, a first PUCCH 2201 and a first PUSCH 2202 are transmitted onto the first carrier through the first antenna, and a second PUCCH 2203 is transmitted onto the second carrier through the second antenna. The PUCCH and the PUSCH in a first subframe are transmitted through the first antenna, and the PUCCH and/or the PUSCH in a second subframe are transmitted through the second antenna.

In the above exemplary embodiments, the number of carriers, the number of transmit antennas, the number of DFT units, the number of IFFT units, and the subcarrier mapping are for exemplary purposes only, and not limited thereto.

The foregoing exemplary embodiments may be combined. For instance, the exemplary embodiments of FIG. 21 and FIG. 22 may be combined, and a plurality of exemplary embodiments may be selectively achieved.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting a control signal in a multiple antenna system, the method comprising:
    transmitting, by a user equipment, a control signal on a first physical uplink control channel (PUCCH) through a first transmit antenna in an uplink subframe; and
    transmitting, by the user equipment, the control signal on a second PUCCH through a second transmit antenna in the uplink subframe,
    wherein the control signal is mapped to a cyclic shifted sequence, the mapped control signal is transmitted by using a pair of resource blocks in the subframe, and one of a pair of resource blocks occupies different subcarriers with the other of the pair of resource blocks,
    wherein the control signal on the first PUCCH is mapped to a first cyclic shifted sequence and the control signal on the second PUCCH is mapped to a second cyclic shifted sequence, and
    wherein the control signal on the first PUCCH and the control signal on the second PUCCH are mapped to different cyclic shifted sequences.

2. The method of claim 1, wherein the first PUCCH and the second PUCCH use different pair of resource blocks in the uplink subframe.

3. The method of claim 1, wherein the first PUCCH and the second PUCCH use same pair of resource blocks in the uplink subframe.

4. The method of claim 1, wherein the control signal is a Hybrid Automatic Repeat Request (HARQ) ACK/NACK.

5. A user equipment configured for transmitting a control signal in a multiple antenna system, the user equipment comprising:
    a first transmit antenna configured to transmit a control signal on a first physical uplink control channel (PUCCH) in an uplink subframe; and
    a second transmit antenna configured to transmit the control signal on a second PUCCH in the uplink subframe,
    wherein the control signal is mapped to a cyclic shifted sequence, the mapped control signal is transmitted by using a pair of resource blocks in the uplink subframe, and one of a pair of resource blocks occupies different subcarriers with the other of the pair of resource blocks,
    wherein the control signal on the first PUCCH is mapped to a first cyclic shifted sequence and the control signal on the second PUCCH is mapped to a second cyclic shifted sequence, and
    wherein the control signal on the first PUCCH and the control signal on the second PUCCH are mapped to different cyclic shifted sequences.

* * * * *